(12) United States Patent
Toebes et al.

(10) Patent No.: US 12,214,959 B2
(45) Date of Patent: *Feb. 4, 2025

(54) AUTOMATED BOT WITH TRANSFER ARM

(71) Applicant: Symbotic LLC, Wilmington, MA (US)

(72) Inventors: Stephen C. Toebes, Sunderland, MA (US); Robert T. Sullivan, Wilmington, MA (US)

(73) Assignee: Symbotic LLC, Wilmington, MA (US)

( * ) Notice: Subject to any disclaimer, the term of this patent is extended or adjusted under 35 U.S.C. 154(b) by 104 days.

This patent is subject to a terminal disclaimer.

(21) Appl. No.: 17/393,221

(22) Filed: Aug. 3, 2021

(65) Prior Publication Data

US 2021/0380337 A1    Dec. 9, 2021

Related U.S. Application Data

(63) Continuation of application No. 13/326,952, filed on Dec. 15, 2011, now Pat. No. 11,078,017.

(60) Provisional application No. 61/423,365, filed on Dec. 15, 2010.

(51) Int. Cl.
  *B65G 1/04*    (2006.01)
(52) U.S. Cl.
  CPC ................. *B65G 1/0492* (2013.01)
(58) Field of Classification Search
  CPC .................................................. B65G 1/0492
  USPC .............. 414/270, 279, 280, 281, 282
  See application file for complete search history.

(56) References Cited

U.S. PATENT DOCUMENTS

| | | | |
|---|---|---|---|
| 1,845,962 A | 2/1932 | Dorr |
| 1,887,667 A | 11/1932 | Wheeler |
| 2,606,508 A | 8/1952 | van Nes |
| 2,656,995 A | 10/1953 | Wolf |
| 2,673,689 A | 3/1954 | Bonanno |
| 2,792,234 A | 5/1957 | Page |
| 2,840,248 A | 6/1958 | Grove et al. |
| 2,877,575 A | 3/1959 | Stedt |
| 2,923,421 A | 2/1960 | Roumefort |
| 2,945,604 A | 7/1960 | Kroll |

(Continued)

FOREIGN PATENT DOCUMENTS

| | | |
|---|---|---|
| DE | 20011661 | 12/2000 |
| DE | 10142395 | 11/2002 |

(Continued)

*Primary Examiner* — Saul Rodriguez
*Assistant Examiner* — Willie W Berry, Jr.
(74) *Attorney, Agent, or Firm* — Perman & Green, LLP

(57) ABSTRACT

A method for transporting a payload pickface, the method comprising an autonomous transport vehicle payload bed of an autonomous guided transport vehicle and providing a transfer arm disposed in the autonomous transport vehicle payload bed and defining at least a portion of the autonomous transport vehicle payload bed so that a payload pickface is seated on and stably held in the autonomous transport vehicle payload bed by at least a portion of the transfer arm for autonomous guided transport vehicle travel, the transfer arm being configured to extend along a first axis to transfer the payload pickface to and from the autonomous transport vehicle payload bed, and effecting picking and placing of the payload pickface with the transfer arm including fingers that define a payload bed support surface of the autonomous transport vehicle payload bed.

17 Claims, 11 Drawing Sheets

(56) References Cited

U.S. PATENT DOCUMENTS

| | | |
|---|---|---|
| 2,996,621 A | 8/1961 | Barrett, Jr. |
| 3,161,303 A | 12/1964 | Burrows |
| 3,162,459 A | 12/1964 | Marmorine et al. |
| 3,269,744 A | 8/1966 | Dobson |
| 3,369,648 A | 2/1968 | Wentz |
| 3,370,492 A | 2/1968 | Treff |
| 3,512,625 A | 5/1970 | Burgess et al. |
| 3,519,149 A | 7/1970 | Saul |
| 3,554,390 A | 1/1971 | Saul |
| 3,636,586 A | 1/1972 | Bollinger et al. |
| 3,677,421 A | 7/1972 | Kintner |
| 3,732,828 A | 5/1973 | Wanner |
| 3,737,056 A | 6/1973 | Hathcock |
| 3,738,506 A | 6/1973 | Cornford et al. |
| 3,744,945 A | 7/1973 | Metrailer |
| 3,746,189 A | 7/1973 | Burch et al. |
| 3,751,758 A | 8/1973 | Higbee et al. |
| 3,774,543 A | 11/1973 | Welsh |
| 3,782,565 A | 1/1974 | Doran et al. |
| 3,789,765 A | 2/1974 | Schultz |
| 3,802,580 A | 4/1974 | Castaldi |
| 3,811,383 A | 5/1974 | Butzow |
| 3,822,647 A | 7/1974 | Hill et al. |
| 3,850,111 A | 11/1974 | Hansen |
| 3,876,087 A | 4/1975 | Osta |
| 3,876,095 A | 4/1975 | Stedt |
| 3,896,955 A | 7/1975 | Collins et al. |
| 3,904,216 A | 9/1975 | Metrailer |
| 3,940,105 A | 2/1976 | Metrailer |
| 3,970,840 A | 7/1976 | De Bruine |
| 3,976,302 A | 8/1976 | Hammarstrand |
| 3,984,012 A | 10/1976 | Ennis et al. |
| 4,007,843 A | 2/1977 | Lubbers et al. |
| 4,026,365 A | 5/1977 | Andersson et al. |
| 4,037,291 A | 7/1977 | Huempfner et al. |
| 4,057,019 A | 11/1977 | Shaffer |
| 4,064,986 A | 12/1977 | Bertovich |
| 4,072,203 A | 2/1978 | Pierson |
| 4,079,955 A | 3/1978 | Thorpe et al. |
| 4,087,116 A | 5/1978 | Morimoto |
| 4,174,854 A | 11/1979 | Spicka et al. |
| 4,183,304 A | 1/1980 | Forster |
| 4,213,396 A | 7/1980 | Mehren et al. |
| 4,214,535 A | 7/1980 | Gerhard |
| 4,219,296 A | 8/1980 | Fujii et al. |
| 4,223,611 A | 9/1980 | Dawson et al. |
| 4,265,582 A | 5/1981 | Theobald |
| 4,268,207 A | 5/1981 | Pipes |
| 4,271,764 A | 6/1981 | Braun et al. |
| 4,273,234 A | 6/1981 | Bourgeois |
| 4,307,988 A | 12/1981 | Page et al. |
| 4,346,659 A | 8/1982 | Binder |
| 4,349,937 A | 9/1982 | Fontana |
| 4,349,938 A | 9/1982 | Fontana |
| 4,353,572 A | 10/1982 | McCain |
| 4,372,219 A | 2/1983 | Gibbs |
| 4,372,724 A | 2/1983 | Stolzer |
| 4,394,104 A | 7/1983 | Camerini et al. |
| 4,395,181 A | 7/1983 | Loomer |
| 4,406,570 A | 9/1983 | Duncan et al. |
| 4,428,708 A | 1/1984 | Burt |
| 4,445,440 A | 5/1984 | Geiss |
| 4,459,078 A | 7/1984 | Chiantella et al. |
| 4,470,742 A | 9/1984 | Schindler |
| 4,492,504 A | 1/1985 | Hainsworth |
| 4,505,630 A | 3/1985 | Kaschner et al. |
| 4,527,486 A | 7/1985 | Baird et al. |
| 4,538,950 A | 9/1985 | Shiomi et al. |
| 4,621,526 A | 11/1986 | Carr et al. |
| 4,678,390 A | 7/1987 | Bonneton et al. |
| 4,679,149 A | 7/1987 | Merz |
| 4,715,662 A | 12/1987 | van Zanten et al. |
| 4,716,530 A | 12/1987 | Ogawa et al. |
| 4,726,725 A | 2/1988 | Baker et al. |
| 4,733,740 A | 3/1988 | Bigowsky et al. |
| 4,750,429 A | 6/1988 | Mordaunt et al. |
| 4,773,807 A | 9/1988 | Kroll et al. |
| 4,786,229 A | 11/1988 | Henderson |
| 4,812,985 A | 3/1989 | Hambrick et al. |
| 4,856,956 A | 8/1989 | Zur |
| 4,862,807 A | 9/1989 | Guadagno |
| 4,878,876 A | 11/1989 | Ishimoto |
| 4,883,401 A | 11/1989 | Kavieff |
| 4,887,016 A | 12/1989 | Malick |
| 4,905,783 A | 3/1990 | Bober |
| 4,909,697 A | 3/1990 | Bernard, II et al. |
| 4,936,738 A | 6/1990 | Brennan et al. |
| 4,942,826 A | 7/1990 | Erickson |
| 4,966,242 A | 10/1990 | Baillargeon |
| 4,966,513 A | 10/1990 | Motoda |
| 4,993,905 A | 2/1991 | Potocnjak |
| 5,002,449 A | 3/1991 | Kita et al. |
| 5,004,399 A | 4/1991 | Sullivan et al. |
| 5,015,145 A | 5/1991 | Angell et al. |
| 5,069,592 A | 12/1991 | Galperin |
| 5,096,355 A | 3/1992 | Schroder |
| 5,134,353 A | 7/1992 | Kita et al. |
| 5,134,940 A | 8/1992 | Fujita et al. |
| 5,135,344 A | 8/1992 | Kita et al. |
| 5,140,787 A | 8/1992 | Corcoran |
| 5,149,654 A | 9/1992 | Gross et al. |
| 5,156,639 A | 10/1992 | Bostrom |
| 5,163,001 A | 11/1992 | Luke, Jr. |
| 5,165,838 A | 11/1992 | Kallansrude et al. |
| 5,168,815 A | 12/1992 | Comer et al. |
| 5,179,329 A | 1/1993 | Nishikawa et al. |
| 5,187,664 A | 2/1993 | Yardley et al. |
| 5,199,840 A | 4/1993 | Castaldi et al. |
| 5,213,463 A | 5/1993 | Rothlisberger et al. |
| 5,218,909 A | 6/1993 | Ng |
| 5,219,264 A | 6/1993 | McClure et al. |
| 5,226,782 A | 7/1993 | Rigling |
| 5,238,100 A | 8/1993 | Rose, Jr. et al. |
| 5,265,944 A | 11/1993 | Gloceri |
| 5,271,703 A | 12/1993 | Lindqvist et al. |
| 5,273,392 A | 12/1993 | Bernard et al. |
| 5,281,901 A | 1/1994 | Yardley et al. |
| 5,286,157 A | 2/1994 | Vainio et al. |
| 5,307,888 A | 5/1994 | Urvoy |
| 5,327,354 A | 7/1994 | Tsujimoto |
| 5,328,316 A | 7/1994 | Hoffmann |
| 5,333,982 A | 8/1994 | Tanizawa et al. |
| 5,333,983 A | 8/1994 | Hatouchi et al. |
| 5,337,880 A | 8/1994 | Claycomb et al. |
| 5,362,197 A | 11/1994 | Rigling |
| 5,370,492 A | 12/1994 | Gleyze et al. |
| 5,377,851 A | 1/1995 | Asano et al. |
| 5,377,910 A | 1/1995 | Newton et al. |
| 5,379,229 A | 1/1995 | Parsons et al. |
| 5,380,139 A | 1/1995 | Pohjonen et al. |
| 5,388,955 A | 2/1995 | Schroder |
| 5,397,212 A | 3/1995 | Watanabe et al. |
| 5,403,147 A | 4/1995 | Tanaka |
| 5,405,232 A | 4/1995 | Lloyd et al. |
| 5,410,969 A | 5/1995 | Rene et al. |
| 5,418,732 A | 5/1995 | McFadin |
| 5,421,265 A | 6/1995 | Suigmoto et al. |
| 5,421,685 A | 6/1995 | Elmer et al. |
| 5,421,697 A | 6/1995 | Ostwald |
| 5,425,612 A | 6/1995 | Ebstein |
| 5,434,490 A | 7/1995 | Ishida et al. |
| 5,445,485 A | 8/1995 | Poulet |
| 5,450,797 A | 9/1995 | Becker et al. |
| 5,460,476 A | 10/1995 | Gazza |
| 5,472,309 A | 12/1995 | Bernard, II et al. |
| 5,501,295 A | 3/1996 | Muller et al. |
| 5,525,884 A | 6/1996 | Sugiura et al. |
| 5,529,165 A | 6/1996 | Shupert |
| 5,548,516 A | 8/1996 | Gudat et al. |
| 5,564,880 A | 10/1996 | Lederer |
| 5,588,796 A | 12/1996 | Ricco et al. |
| 5,601,395 A | 2/1997 | Lichti, Sr. et al. |
| 5,611,422 A | 3/1997 | Harkonen |
| 5,615,992 A | 4/1997 | Proske et al. |

(56) References Cited

U.S. PATENT DOCUMENTS

| | | |
|---|---|---|
| 5,626,362 A | 5/1997 | Mottola |
| 5,632,350 A | 5/1997 | Gauvin |
| 5,650,703 A | 7/1997 | Yardley et al. |
| 5,664,688 A | 9/1997 | Kitanaka et al. |
| 5,667,230 A | 9/1997 | Riley et al. |
| 5,668,724 A | 9/1997 | Ehret et al. |
| 5,707,199 A | 1/1998 | Faller |
| 5,718,322 A | 2/1998 | Mulhern |
| 5,718,551 A | 2/1998 | Ebstein |
| 5,725,063 A | 3/1998 | Ceragioli et al. |
| 5,743,562 A | 4/1998 | Mottola |
| 5,764,014 A | 6/1998 | Jakeway et al. |
| 5,801,506 A | 9/1998 | Netzler |
| 5,802,980 A | 9/1998 | Hofmiller |
| 5,806,870 A | 9/1998 | Hull et al. |
| 5,810,540 A | 9/1998 | Castaldi |
| 5,829,096 A | 11/1998 | Perry |
| 5,833,431 A | 11/1998 | Rosse, III et al. |
| 5,839,872 A | 11/1998 | Goto et al. |
| 5,847,537 A | 12/1998 | Parmley, Sr. |
| 5,857,413 A | 1/1999 | Ward |
| 5,866,469 A | 2/1999 | Hays |
| 5,918,951 A | 7/1999 | Rudd, III |
| 5,927,926 A * | 7/1999 | Yagi ............... B65G 1/0407 414/280 |
| 5,928,058 A | 7/1999 | Francis et al. |
| 5,988,306 A | 11/1999 | Ooishi |
| 6,000,502 A | 12/1999 | Leasor et al. |
| 6,021,367 A | 2/2000 | Pilutti et al. |
| 6,024,381 A | 2/2000 | Mottola |
| 6,036,427 A | 3/2000 | Kita et al. |
| 6,038,501 A | 3/2000 | Kawakami |
| 6,061,607 A | 5/2000 | Bradley et al. |
| 6,062,942 A | 5/2000 | Ogihara |
| 6,116,842 A | 9/2000 | Harris et al. |
| 6,135,697 A | 10/2000 | Isaacs et al. |
| 6,149,366 A | 11/2000 | Deandrea |
| 6,158,566 A | 12/2000 | Pollock |
| 6,220,676 B1 | 4/2001 | Rudd, III |
| 6,257,597 B1 | 7/2001 | Galazin |
| 6,272,406 B2 | 8/2001 | Alofs et al. |
| 6,324,994 B1 | 12/2001 | Glenn |
| 6,325,586 B1 | 12/2001 | Loy |
| 6,341,269 B1 | 1/2002 | Dulaney et al. |
| 6,345,217 B1 | 2/2002 | Zeitler et al. |
| 6,352,035 B1 | 3/2002 | Kashiwase et al. |
| 6,354,430 B1 | 3/2002 | Oe |
| 6,360,673 B1 | 3/2002 | Herrin et al. |
| 6,389,981 B1 | 5/2002 | Strothmann et al. |
| 6,390,756 B1 | 5/2002 | Isaacs et al. |
| 6,391,226 B1 | 5/2002 | Chauvette et al. |
| 6,425,723 B1 | 7/2002 | Okada et al. |
| 6,439,131 B1 | 8/2002 | Higgins |
| 6,439,955 B1 | 8/2002 | Feketo |
| 6,503,043 B1 | 1/2003 | Smith et al. |
| 6,508,102 B1 | 1/2003 | Margolis et al. |
| 6,563,128 B2 | 5/2003 | Lublin et al. |
| 6,600,418 B2 | 7/2003 | Francis et al. |
| 6,601,435 B2 | 8/2003 | Hong |
| 6,629,502 B2 | 10/2003 | Matsukawa |
| 6,631,321 B1 | 10/2003 | Ciprian |
| 6,645,355 B2 | 11/2003 | Hanson et al. |
| 6,652,213 B1 | 11/2003 | Mitchell et al. |
| 6,655,297 B2 | 12/2003 | Kawato et al. |
| 6,692,211 B2 | 2/2004 | Yuyama et al. |
| 6,695,328 B2 | 2/2004 | Cope |
| 6,721,638 B2 | 4/2004 | Zeitler |
| 6,748,292 B2 | 6/2004 | Mountz |
| 6,763,767 B2 | 7/2004 | Jackson et al. |
| 6,808,058 B2 | 10/2004 | Shiohara |
| 6,851,921 B2 | 2/2005 | Haag |
| 6,861,154 B2 | 3/2005 | Olson et al. |
| 6,864,489 B2 | 3/2005 | Chen et al. |
| 6,880,202 B2 | 4/2005 | Thompson et al. |
| 6,928,336 B2 | 8/2005 | Peshkin et al. |
| 6,929,440 B1 | 8/2005 | Grond |
| 6,948,899 B2 | 9/2005 | Lee |
| 6,950,722 B2 | 9/2005 | Mountz |
| 6,988,451 B2 | 1/2006 | Marcotte et al. |
| 6,997,665 B2 | 2/2006 | Bouche et al. |
| 7,002,698 B2 | 2/2006 | Hanson et al. |
| 7,002,772 B2 | 2/2006 | Yardy |
| 7,003,375 B2 | 2/2006 | Inui |
| 7,008,164 B2 | 3/2006 | Rokkaku |
| 7,011,487 B2 | 3/2006 | Kafka et al. |
| 7,017,228 B2 | 3/2006 | Silverstein et al. |
| 7,025,191 B2 | 4/2006 | Lichti et al. |
| 7,058,866 B2 | 6/2006 | Flanagan et al. |
| 7,074,151 B2 | 7/2006 | Thompson |
| 7,085,097 B2 | 8/2006 | Starr et al. |
| 7,100,294 B1 | 9/2006 | Goldsobel et al. |
| 7,101,139 B1 | 9/2006 | Benedict |
| 7,102,848 B2 | 9/2006 | Kumpon et al. |
| 7,110,855 B2 | 9/2006 | Leishman |
| 7,119,982 B2 | 10/2006 | Starr et al. |
| 7,128,196 B2 | 10/2006 | Oldford et al. |
| 7,128,521 B2 | 10/2006 | Hansl |
| 7,135,992 B2 | 11/2006 | Karlsson et al. |
| 7,137,593 B2 | 11/2006 | Baatz |
| 7,145,478 B2 | 12/2006 | Goncalves et al. |
| 7,145,747 B2 | 12/2006 | Brace et al. |
| 7,155,308 B2 | 12/2006 | Jones |
| 7,184,855 B2 | 2/2007 | Stingel, III et al. |
| 7,192,034 B2 | 3/2007 | Radke et al. |
| 7,221,998 B2 | 5/2007 | Brust et al. |
| 7,266,422 B1 | 9/2007 | DeMotte et al. |
| 7,319,320 B2 | 1/2008 | Kawashima et al. |
| 7,329,081 B2 | 2/2008 | Baker et al. |
| 7,381,022 B1 | 6/2008 | King |
| 7,386,379 B2 | 6/2008 | Naik et al. |
| 7,402,018 B2 | 7/2008 | Mountz et al. |
| 7,426,970 B2 | 9/2008 | Olsen |
| 7,433,759 B2 | 10/2008 | Nangoy |
| 7,495,561 B2 | 2/2009 | Bodin et al. |
| 7,506,404 B2 | 3/2009 | Block et al. |
| 7,520,376 B2 | 4/2009 | Bar |
| 7,536,283 B2 | 5/2009 | Potter et al. |
| 7,539,557 B2 | 5/2009 | Yamauchi |
| 7,584,812 B2 | 9/2009 | Radke et al. |
| 7,587,260 B2 | 9/2009 | Bruemmer et al. |
| 7,591,630 B2 | 9/2009 | Lert, Jr. |
| 7,620,477 B2 | 11/2009 | Bruemmer |
| 7,636,982 B2 | 12/2009 | Jones et al. |
| 7,641,014 B2 | 1/2010 | Hu |
| 7,648,002 B2 | 1/2010 | Easton et al. |
| 7,661,920 B2 | 2/2010 | Kantola et al. |
| 7,668,621 B2 | 2/2010 | Bruemmer |
| 7,671,293 B2 | 3/2010 | Fry et al. |
| 7,682,122 B2 | 3/2010 | Maynard et al. |
| 7,686,560 B2 | 3/2010 | Laurin et al. |
| 7,689,318 B2 | 3/2010 | Draper |
| 7,695,235 B1 | 4/2010 | Rallis |
| 7,730,781 B2 | 6/2010 | Zhang et al. |
| 7,751,928 B1 | 7/2010 | Antony et al. |
| 7,769,513 B2 | 8/2010 | Breed et al. |
| 7,771,152 B2 | 8/2010 | Waltersbacher |
| 7,792,350 B2 | 9/2010 | Kiley et al. |
| 7,793,742 B2 | 9/2010 | Donaldson et al. |
| 7,801,644 B2 | 9/2010 | Bruemmer et al. |
| 7,826,919 B2 | 11/2010 | D'Andrea et al. |
| 7,826,926 B2 | 11/2010 | Myeong et al. |
| 7,861,844 B2 | 1/2011 | Hayduchok et al. |
| 7,866,671 B2 | 1/2011 | Madler |
| 7,885,750 B2 | 2/2011 | Lu |
| 7,909,562 B2 | 3/2011 | Mead |
| 7,926,145 B2 | 4/2011 | Liao |
| 7,931,431 B2 | 4/2011 | Benedict et al. |
| 7,960,973 B2 | 6/2011 | Zeller et al. |
| 7,965,871 B2 | 6/2011 | Ihara et al. |
| 7,967,354 B2 | 6/2011 | Faulkner et al. |
| 7,974,738 B2 | 7/2011 | Bruemmer et al. |
| 7,991,505 B2 | 8/2011 | Lert, Jr. et al. |
| 8,000,835 B2 | 8/2011 | Friz et al. |
| 8,001,837 B2 | 8/2011 | Larson et al. |

(56) References Cited

U.S. PATENT DOCUMENTS

| | | |
|---|---|---|
| 8,006,824 B2 | 8/2011 | Wada et al. |
| 8,007,221 B1 | 8/2011 | More et al. |
| 8,024,066 B2 | 9/2011 | Reverte et al. |
| 8,031,086 B2 | 10/2011 | Thacher et al. |
| 8,041,456 B1 | 10/2011 | Blackwell et al. |
| 8,042,627 B2 | 10/2011 | Yang et al. |
| 8,060,257 B2 | 11/2011 | Close et al. |
| 8,136,650 B2 | 3/2012 | Frich et al. |
| 8,280,548 B2 | 10/2012 | Zuber et al. |
| 8,364,309 B1 | 1/2013 | Bailey |
| 8,378,825 B2 | 2/2013 | Dahms et al. |
| 8,425,173 B2 | 4/2013 | Lert et al. |
| 8,480,347 B2 | 7/2013 | Schafer |
| 8,515,575 B2 | 8/2013 | Pfeiffer |
| 8,594,835 B2 | 11/2013 | Lert et al. |
| 8,965,619 B2 | 2/2015 | Sullivan et al. |
| 9,020,639 B2 | 4/2015 | Bewley et al. |
| 9,037,286 B2 | 5/2015 | Lert |
| 9,327,903 B2 | 5/2016 | Toebes et al. |
| 2002/0029719 A1 | 3/2002 | Matsukawa |
| 2002/0037208 A1 | 3/2002 | Patrito |
| 2002/0076307 A1 | 6/2002 | Fallin et al. |
| 2003/0033217 A1 | 2/2003 | Cutlip |
| 2003/0051544 A1 | 3/2003 | Hong |
| 2003/0074125 A1 | 4/2003 | Walenty et al. |
| 2003/0185656 A1 | 10/2003 | Hansl |
| 2003/0200129 A1 | 10/2003 | Klaubauf et al. |
| 2004/0093116 A1 | 5/2004 | Mountz |
| 2004/0136821 A1 | 7/2004 | Berger et al. |
| 2004/0167667 A1 | 8/2004 | Goncalves et al. |
| 2004/0238326 A1 | 12/2004 | Lichti |
| 2005/0029029 A1 | 2/2005 | Thorne |
| 2005/0047895 A1 | 3/2005 | Lert, Jr. |
| 2005/0095095 A1 | 5/2005 | Hansl |
| 2005/0131645 A1 | 6/2005 | Panopoulos |
| 2005/0151360 A1 | 7/2005 | Bertrand et al. |
| 2005/0166787 A1 | 8/2005 | Astrom |
| 2005/0212478 A1 | 9/2005 | Takenaka |
| 2005/0217532 A1 | 10/2005 | Conneally |
| 2005/0238455 A1 | 10/2005 | Toteff |
| 2005/0238465 A1 | 10/2005 | Ruazumov |
| 2006/0018996 A1 | 1/2006 | Pollock et al. |
| 2006/0058921 A1 | 3/2006 | Okamoto |
| 2006/0104712 A1 | 5/2006 | Bufano et al. |
| 2006/0210382 A1 | 9/2006 | Mountz |
| 2006/0216137 A1 | 9/2006 | Sakata et al. |
| 2006/0220335 A1 | 10/2006 | Damm |
| 2006/0232025 A1 | 10/2006 | Braud |
| 2006/0245862 A1 | 11/2006 | Hansl et al. |
| 2006/0257236 A1 | 11/2006 | Stingel, III et al. |
| 2007/0021864 A1 | 1/2007 | Mountz et al. |
| 2007/0059132 A1 | 3/2007 | Akamatsu et al. |
| 2007/0065258 A1 | 3/2007 | Benedict et al. |
| 2007/0071585 A1 | 3/2007 | Henkel |
| 2007/0125727 A1 | 6/2007 | Winkler |
| 2007/0177011 A1 | 8/2007 | Lewin et al. |
| 2007/0276535 A1 | 11/2007 | Haag |
| 2007/0288123 A1 | 12/2007 | D'Andrea et al. |
| 2007/0290040 A1 | 12/2007 | Wurman et al. |
| 2007/0293978 A1 | 12/2007 | Wurman et al. |
| 2007/0297879 A1 | 12/2007 | Yuyama et al. |
| 2008/0001372 A1 | 1/2008 | Hoffman et al. |
| 2008/0023639 A1 | 1/2008 | Kawasaki et al. |
| 2008/0065265 A1 | 3/2008 | Ozick et al. |
| 2008/0154429 A1 | 6/2008 | Lee et al. |
| 2008/0161987 A1 | 7/2008 | Breed |
| 2008/0166217 A1 | 7/2008 | Fontana |
| 2008/0215180 A1 | 9/2008 | Kota |
| 2008/0269960 A1 | 10/2008 | Kostmann |
| 2008/0275609 A1 | 11/2008 | Boydell |
| 2008/0281717 A1 | 11/2008 | Kortelainen |
| 2009/0074545 A1 | 3/2009 | Lert, Jr. et al. |
| 2009/0099879 A1 | 4/2009 | Ouimet |
| 2009/0114115 A1 | 5/2009 | Minges |
| 2009/0185884 A1 | 7/2009 | Wurman et al. |
| 2009/0188774 A1 | 7/2009 | Tsujimoto |
| 2009/0216366 A1 | 8/2009 | Zuber et al. |
| 2009/0265031 A1 | 10/2009 | Tachibana et al. |
| 2010/0043665 A1 | 2/2010 | Brigham |
| 2010/0044124 A1 | 2/2010 | Radke et al. |
| 2010/0044977 A1 | 2/2010 | Hughes et al. |
| 2010/0076591 A1 | 3/2010 | Lert, Jr. |
| 2010/0086385 A1 | 4/2010 | Shani |
| 2010/0102532 A1 | 4/2010 | Timoney et al. |
| 2010/0131182 A1 | 5/2010 | Deegan et al. |
| 2010/0135759 A1 | 6/2010 | Dillon |
| 2010/0141483 A1 | 6/2010 | Thacher et al. |
| 2010/0145507 A1 | 6/2010 | Blust et al. |
| 2010/0167556 A1 | 7/2010 | Totsu et al. |
| 2010/0218697 A1 | 9/2010 | Sugimoto |
| 2010/0224427 A1 | 9/2010 | Nuchter et al. |
| 2010/0234995 A1 | 9/2010 | Zini et al. |
| 2010/0272546 A1 | 10/2010 | Wolkerstorfer |
| 2010/0286905 A1 | 11/2010 | Goncalves et al. |
| 2010/0290874 A1 | 11/2010 | Wolkerstorfer |
| 2010/0316468 A1 | 12/2010 | Lert et al. |
| 2010/0316469 A1 | 12/2010 | Lert et al. |
| 2010/0324815 A1 | 12/2010 | Hiruta et al. |
| 2011/0008138 A1 | 1/2011 | Yamashita |
| 2011/0068943 A1 | 3/2011 | Lane, Jr. |
| 2011/0090064 A1 | 4/2011 | Dahms et al. |
| 2011/0106339 A1 | 5/2011 | Phillips et al. |
| 2011/0130974 A1 | 6/2011 | Yngve et al. |
| 2011/0176895 A1 | 7/2011 | Kortelainen |
| 2011/0185975 A1 | 8/2011 | van den Berg et al. |
| 2011/0202175 A1 | 8/2011 | Romanov et al. |
| 2011/0231016 A1 | 9/2011 | Goulding |
| 2011/0271469 A1 | 11/2011 | Ziegler et al. |
| 2012/0099953 A1 | 4/2012 | Hortig et al. |
| 2012/0185122 A1 | 7/2012 | Sullivan et al. |
| 2012/0186192 A1 | 7/2012 | Tobes et al. |
| 2012/0189409 A1 | 7/2012 | Toebes et al. |
| 2012/0189416 A1 | 7/2012 | Toebes et al. |
| 2012/0247239 A1 | 10/2012 | Hortig et al. |
| 2012/0277940 A1 | 11/2012 | Kumar et al. |
| 2012/0299260 A1 | 11/2012 | Goertzen et al. |
| 2013/0061420 A1 | 3/2013 | Vanderstegen-Drake et al. |
| 2013/0094926 A1 | 4/2013 | Olszak et al. |
| 2013/0142599 A1 | 6/2013 | McDowell, Jr. et al. |
| 2014/0350725 A1 | 11/2014 | Lafary et al. |
| 2015/0081089 A1 | 3/2015 | Kapust et al. |
| 2015/0150429 A1 | 6/2015 | Yoo et al. |
| 2015/0314446 A1 | 11/2015 | Day et al. |
| 2015/0336741 A1 | 11/2015 | Ahammer et al. |
| 2016/0000282 A1 | 1/2016 | Vanderstegen-Drake et al. |
| 2016/0121486 A1 | 5/2016 | Lipinski et al. |
| 2016/0214808 A1 | 7/2016 | Cyrulik et al. |
| 2017/0083020 A1 | 3/2017 | Purwin et al. |
| 2017/0320522 A1 | 11/2017 | Lorenz et al. |

FOREIGN PATENT DOCUMENTS

| | | |
|---|---|---|
| DE | 102011012950 | 9/2012 |
| EP | 0466004 | 1/1992 |
| EP | 0499276 | 8/1992 |
| EP | 0647575 | 4/1995 |
| EP | 0733563 | 9/1996 |
| EP | 0737630 | 10/1996 |
| EP | 1193195 | 4/2002 |
| EP | 1598291 | 11/2005 |
| EP | 1627830 | 2/2006 |
| EP | 1775240 | 4/2007 |
| JP | 1179321 | 3/1993 |
| JP | 061309 | 1/1994 |
| JP | 07157013 | 6/1995 |
| JP | 07187330 | 7/1995 |
| JP | 07187331 | 7/1995 |
| JP | 081553 | 1/1996 |
| JP | 08091795 | 4/1996 |
| JP | 08113321 | 5/1996 |
| JP | 08133426 | 5/1996 |
| JP | 08258763 | 10/1996 |
| JP | 0948507 | 2/1997 |
| JP | 09148401 | 6/1997 |

(56) References Cited

FOREIGN PATENT DOCUMENTS

| | | |
|---|---|---|
| JP | 11124298 | 5/1999 |
| JP | 1118069 | 7/1999 |
| JP | 11296226 | 10/1999 |
| JP | 2000118615 | 4/2000 |
| JP | 2000118639 | 4/2000 |
| JP | 2000122720 | 4/2000 |
| JP | 2000298518 | 10/2000 |
| JP | 2001344020 | 12/2001 |
| JP | 2002356207 | 12/2001 |
| JP | 2003012117 | 1/2003 |
| JP | 2003063610 | 3/2003 |
| JP | 2003246413 | 9/2003 |
| JP | 2003316437 | 11/2003 |
| JP | 2003321102 | 11/2003 |
| JP | 2004043109 | 2/2004 |
| JP | 2004249895 | 9/2004 |
| JP | 2005082331 | 3/2005 |
| JP | 2005138956 | 6/2005 |
| JP | 2006138956 | 6/2005 |
| JP | 2005206259 | 8/2005 |
| JP | 2005297809 | 10/2005 |
| JP | 2006137577 | 6/2006 |
| JP | 2006160523 | 6/2006 |
| JP | 2008009765 | 1/2008 |
| JP | 2010055444 | 3/2011 |
| WO | 0187648 | 11/2001 |
| WO | 2005009324 | 2/2005 |
| WO | 2005056943 | 6/2005 |
| WO | 2006024035 | 3/2006 |
| WO | 2006095047 | 9/2006 |

\* cited by examiner

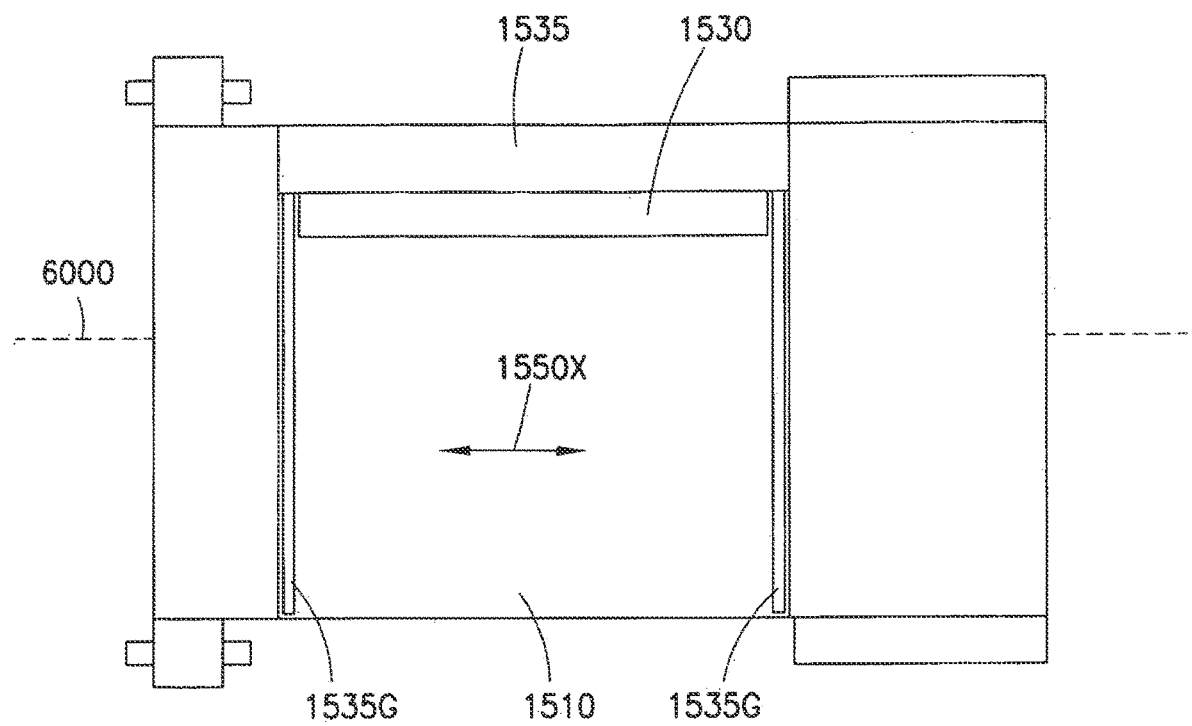
FIG.5A
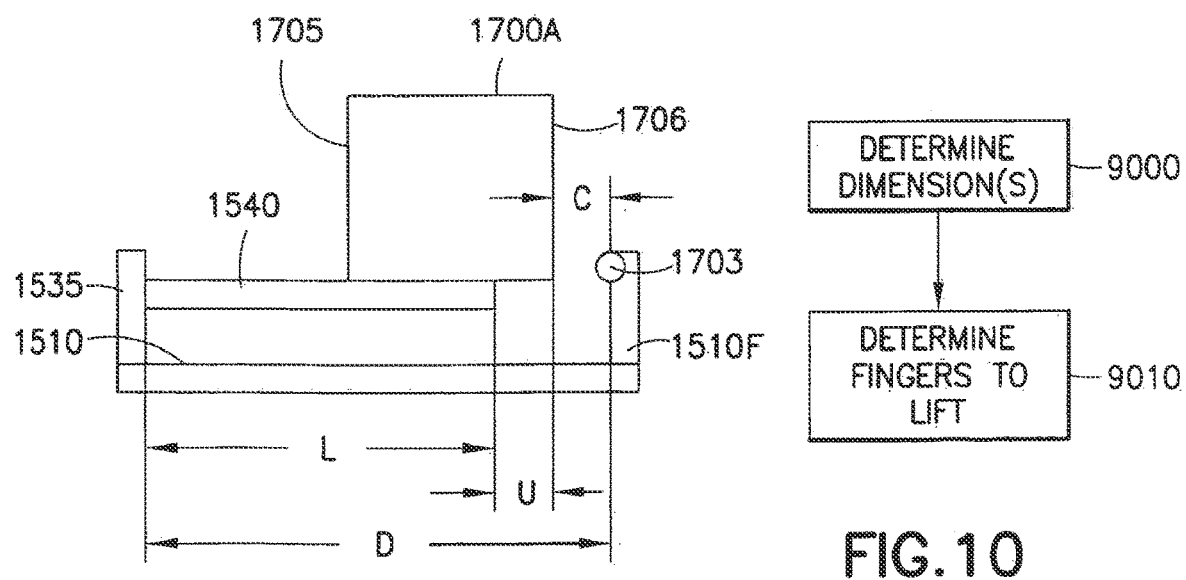
FIG.9
FIG.10

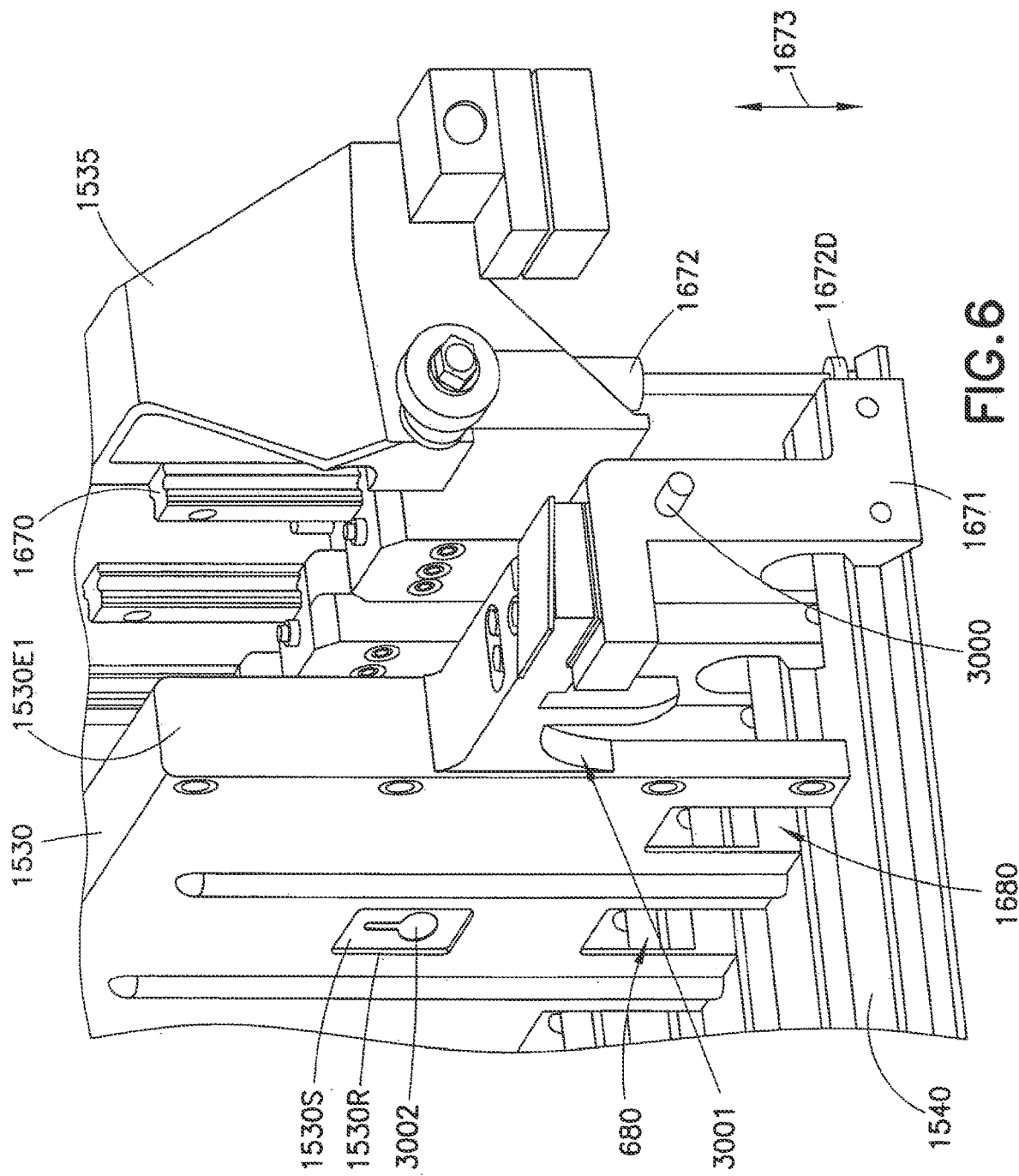

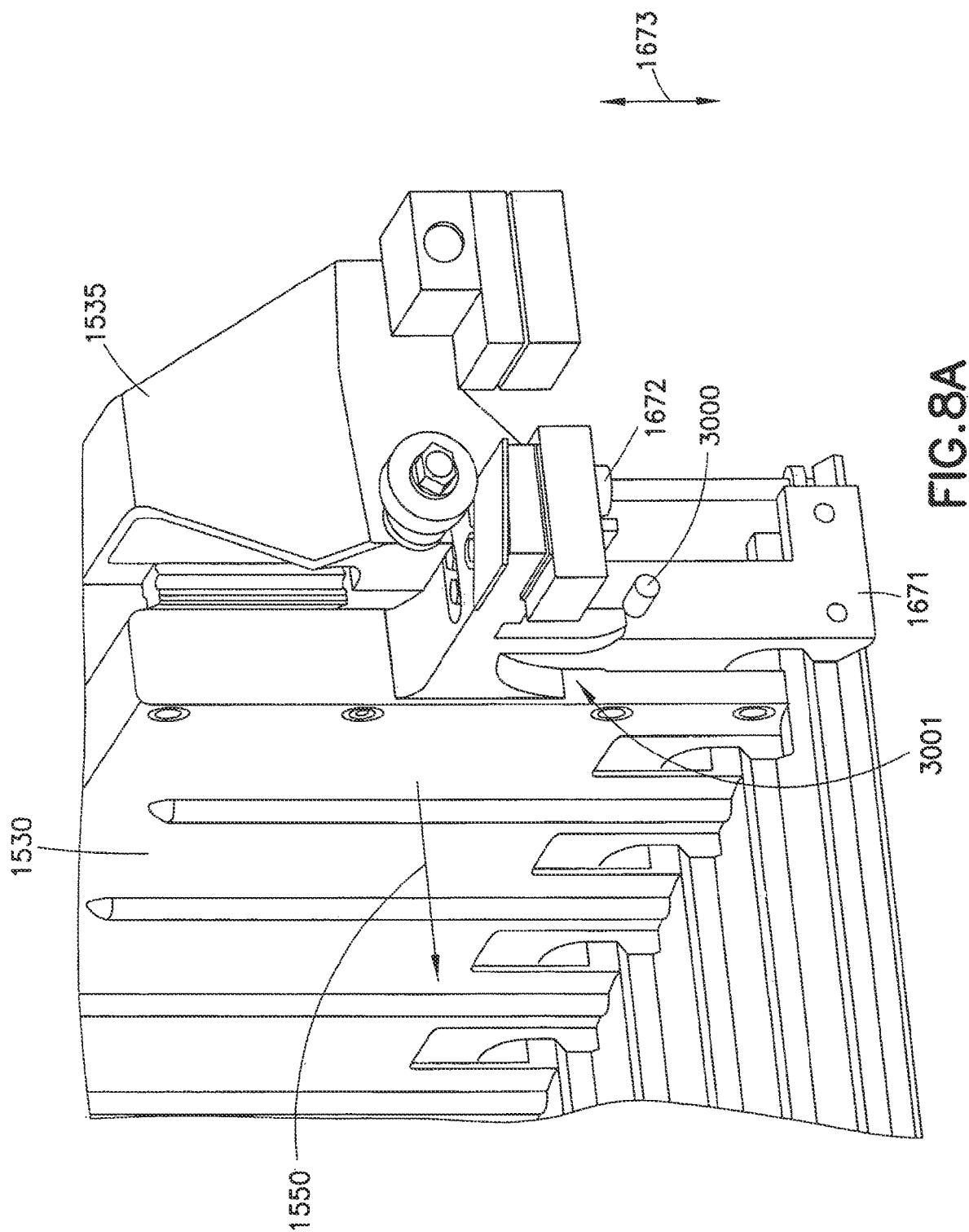

AUTOMATED BOT WITH TRANSFER ARM

CROSS-REFERENCE TO RELATED APPLICATIONS

This application is a continuation of Ser. No. 13/326,952, filed Dec. 15, 2011, (now U.S. Pat. No. 11,078,017), which is a non-provisional of and claims the benefit of U.S. provisional patent application No. 61/423,365, filed on Dec. 15, 2010, the disclosures of which are incorporated by reference herein in their entireties.

BACKGROUND

1. Field

The embodiments generally relate to storage and retrieval systems and, more particularly, to autonomous transports of the storage and retrieval systems.

2. Brief Description of Related Developments

Warehouses for storing case units may generally comprise a series of storage racks that are accessible by transport devices such as, for example, fork lifts, carts and elevators that are movable within aisles between or along the storage racks or by other lifting and transporting devices. These transport devices may be automated or manually driven. Generally the items transported to/from and stored on the storage racks are contained in carriers, for example storage containers such as trays, totes or shipping cases, or on pallets.

When transporting the cases to and from the storage racks with automated transports it would be advantageous to be able to minimize the number of drive motors of the automated transports and to control fingers of the automated transports' transfer arm for picking and placing case units to storage locations or conveyor locations.

BRIEF DESCRIPTION OF THE DRAWINGS

The foregoing aspects and other features of the disclosed embodiments are explained in the following description, taken in connection with the accompanying drawings, wherein:

FIGS. 5 and 5A are illustrations of exemplary autonomous transport vehicles in accordance with aspects of the embodiments;

FIGS. 6-9 are schematic illustrations of portions of the exemplary autonomous transport vehicle of FIG. 5 in accordance with an aspect of the embodiments;

FIG. 10 is a flow diagram in accordance with an aspect of the disclosed embodiments.

DETAILED DESCRIPTION OF THE EXEMPLARY EMBODIMENT(S)

Figure 1:
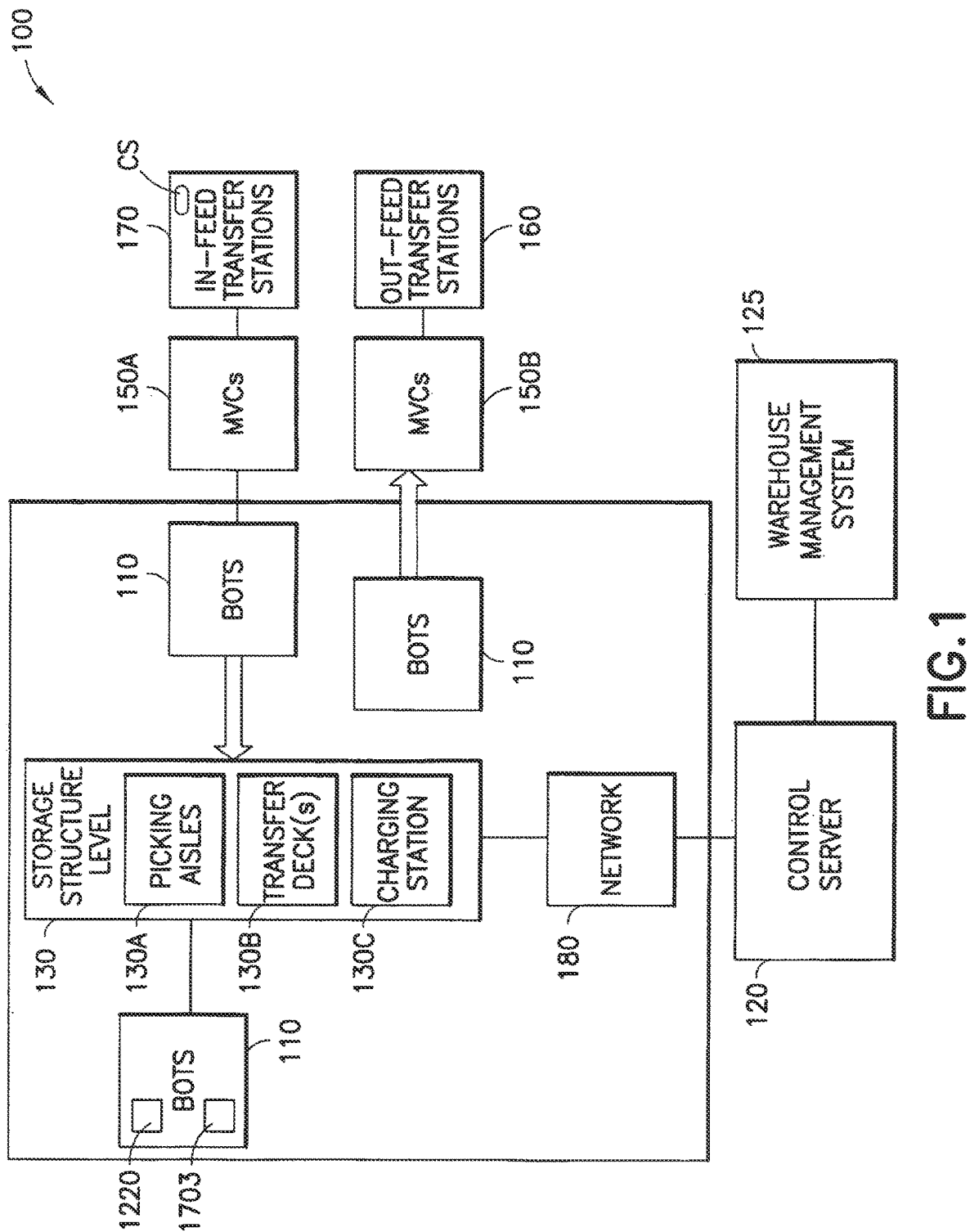
FIG. 1 schematically illustrates an exemplary storage and retrieval system in accordance with the an aspect of embodiments.

FIG. 1 schematically illustrates an exemplary storage and retrieval system in accordance with the embodiments. Although the disclosed embodiments will be described with reference to the embodiments shown in the drawings, it should be understood that the disclosed embodiments can be embodied in many alternate forms. In addition, any suitable size, shape or type of elements or materials could be used.

In accordance with the embodiments the storage and retrieval system 100 may operate in a retail distribution center or warehouse to, for example, fulfill orders received from retail stores for case units (where case units as used herein means items not stored in trays, on totes or on pallets, e.g. uncontained or items stored in trays, totes or on pallets). It is noted that the case units may include cases of items (e.g. case of soup cans, boxes of cereal, etc.) or individual items that are adapted to be taken off of or placed on a pallet. In accordance with the embodiments, shipping cases or case units (e.g. cartons, barrels, boxes, crates, jugs, totes, pallets or any other suitable device for holding case units) may have variable sizes and may be used to hold items in shipping and may be configured so they are capable of being palletized for shipping. It is noted that when, for example, bundles or pallets of case units arrive at the storage and retrieval system the content of each pallet may be uniform (e.g. each pallet holds a predetermined number of the same item—one pallet holds soup and another pallet holds cereal) and as pallets leave the storage and retrieval system the pallets may contain any suitable number and combination of different items (e.g. each pallet may hold different types of items—a pallet holds a combination of soup and cereal). It is noted that the storage and retrieval system described herein may be applied to any environment in which case units are stored and retrieved.

The storage and retrieval system 100 may be configured for installation in, for example, existing warehouse structures or adapted to new warehouse structures. In the embodiments, the storage and retrieval system may include in-feed and out-feed transfer stations 170, 160, multilevel vertical conveyors 150A, 150B, a storage structure 130, and a number of autonomous transport vehicles or robots 110 (referred to herein as "bots"). The storage and retrieval system may also include robot or bot transfer stations (as described in, for example, U.S. patent application Ser. No. 12/757,220, entitled "STORAGE AND RETRIEVAL SYSTEM" and filed on Apr. 9, 2010, the disclosure of which is incorporated by reference herein in its entirety) that may provide an indirect interface between the bots 110 and the multilevel vertical conveyor 150A, 150B. The in-feed transfer stations 170 and out-feed transfer stations 160 may operate together with their respective multilevel vertical conveyors 150A, 150B for bi-directionally transferring case units to and from one or more levels of the storage structure 130. It is noted that while the multilevel vertical conveyors are described herein as being dedicated inbound or in-feed conveyors 150A and outbound or out-feed conveyors 150B, each of the conveyors 150A, 150B may be used for both inbound and outbound transfer of case units/items from the storage and retrieval system. The multilevel vertical conveyors may be any suitable lifting devices for transporting case units between levels of the storage and retrieval system. It is noted that while multilevel vertical conveyors are described herein in other aspects the conveyors may be any suitable conveyors or transfer/picking devices having any suitable transport path orientation. Some non-limiting suitable examples of multilevel vertical conveyors can be found in, for example, U.S. Provisional Patent Application No. 61/423,298 entitled "LIFT INTERFACE FOR STORAGE AND RETRIEVAL SYSTEMS" and filed on Dec. 15, 2010 (now U.S. Pat. No. 8,998,554 filed on Dec. 15, 2011 and issued on Apr. 7, 2015), and U.S. patent application Ser. No. 12/757,354, entitled "LIFT INTERFACE FOR STORAGE AND RETRIEVAL SYSTEMS" and filed on Apr. 9, 2010, the disclosures of which are incorporated by reference herein in their entireties, and U.S. patent application Ser. No. 12/757,220, entitled "STORAGE AND RETRIEVAL SYSTEM," (previously incorporated by reference). For example, the multilevel vertical conveyors may have any suitable number of support shelves for transporting the case units to a predetermined level of the storage and retrieval system. The support shelves may have slatted supports configured to allow fingers of the bots 110 or in-feed/out-feed transfer stations 170, 160 to pass between the slats for transferring case units to and from the conveyor. It is noted that the transfer of case units between the bots and the multilevel vertical conveyors may occur in any suitable manner.

As may be realized, the storage and retrieval system 100 may include multiple in-feed and out-feed multilevel vertical conveyors 150A, 150B that are accessible by, for example, bots 110 on each level of the storage and retrieval system 100 so that one or more case unit(s) can be transferred from a multilevel vertical conveyor 150A, 150B to each storage space on a respective level and from each storage space to any one of the multilevel vertical conveyors 150A, 150B on a respective level. The bots 110 may be configured to transfer the case units between the storage spaces and the multilevel vertical conveyors with one pick (e.g. substantially directly between the storage spaces and the multilevel vertical conveyors). By way of further example, the designated bot 110 picks the case unit(s) from a shelf of a multilevel vertical conveyor, transports the case unit(s) to a predetermined storage area of the storage structure 130 and places the case unit(s) in the predetermined storage area (and vice versa).

The bots 110 may be configured to place case units, such as the above described retail merchandise, into picking stock in the one or more levels of the storage structure 130 and then selectively retrieve ordered items for shipping the ordered items to, for example, a store or other suitable location. In the embodiments, the bots 110 may interface in any suitable manner with the multilevel vertical conveyors 150A, 150B such as through, for example, extension of a transfer arm or effector of the bot (which may have fingers for interfacing with slatted support shelves of the multi-level vertical conveyors) relative to a frame of the bot. Suitable examples of bots are described in U.S. patent application Ser. No. 12/757,312, entitled "AUTONOMOUS TRANSPORTS FOR STORAGE AND RETRIEVAL SYSTEMS" and filed on Apr. 9, 2010, U.S. Provisional Patent Application No. 61/423,220 entitled "BOT PAYLOAD ALIGNMENT AND SENSING" and filed on Dec. 15, 2010 (now U.S. Pat. No. 9,187,244 filed on Dec. 15, 2011 and issued on Nov. 17, 2015), U.S. Provisional Patent Application No. 61/423,388 entitled "AUTOMATED BOT TRANSFER ARM DRIVE SYSTEM" and filed on Dec. 15, 2010 (now U.S. Pat. No. 9,499,338 filed on Dec. 15, 2011 and issued on Nov. 22, 2016), U.S. Provisional Patent Application No. 61/423,359 entitled "BOT HAVING HIGH SPEED STABILITY" and filed on Dec. 15, 2010 (now U.S. Pat. No. 8,965,619 filed on Dec. 15, 2011 and issued on Feb. 24, 2015), and U.S. Provisional Patent Application No. 61/423,206 entitled "BOT POSITION SENSING" and filed on Dec. 15, 2010 (now U.S. Pat. No. 9,008,884 filed on Dec. 15, 2011 and issued on Apr. 14, 2105), the disclosures of which are incorporated by reference herein in their entireties.

The storage structure 130 may include multiple levels of storage rack modules where each level includes an array of storage spaces (arrayed on the multiple levels and in multiple rows on each level), picking aisles 130A formed between the rows of storage spaces, and transfer decks 130B. It is noted that each level may also include respective bot transfer stations for providing an indirect interface between the bots and the multilevel vertical conveyors. In the embodiments, the picking aisles 130A and transfer decks 130B may be arranged for allowing the bots 110 to traverse respective levels of the storage structure 130 for placing case units into picking stock and to retrieve the ordered case units. As may be realized, the storage and retrieval system may be configured to allow random accessibility to the storage spaces. For example, all storage spaces in the storage structure 130 may be treated substantially equally when determining which storage spaces are to be used when picking and placing case units from/to the storage structure 130 such that any storage space of sufficient size can be used to store items. The storage structure 130 of the embodiments may also be arranged such that there is no vertical or horizontal array partitioning of the storage structure. For example, each multilevel vertical conveyor 150A, 150B is common to all storage spaces (e.g. the array of storage spaces) in the storage structure 130 such that any bot 110 can access each storage space and any multilevel vertical conveyor 150A, 150B can receive case units from any storage space on any level so that the multiple levels in the array of storage spaces substantially act as a single level (e.g. no vertical partitioning). The multilevel vertical conveyors 150A, 150B can also receive case units from any storage space on any level of the storage structure 130 (e.g. no horizontal partitioning). It is noted that the storage and retrieval system may also be configured so that each multilevel vertical conveyor serves a predetermined area of the array of storage spaces.

The storage structure 130 may include charging stations 130C for replenishing, for example, a battery pack of the bots 110. In the embodiments, the charging stations 130C may be located at, for example, transfer areas 295 (FIG. 2) of the transfer deck 130B so that the bots 110 can substantially simultaneously transfer items, for example, to and from a multilevel vertical conveyor 150A, 150B while being charged. It is noted that the charging stations may be located at any suitable location within the storage and retrieval system. The bots 110 and other suitable features of the storage and retrieval system 100 may be controlled in any suitable manner such as, for example, one or more central system control computers (e.g. control server) 120 through, for example, any suitable network 180. The network 180 may be a wired network, a wireless network or a combination of a wireless and wired network using any suitable type and/or number of communication protocols. It is noted that, in the embodiments, the system control server 120 may be configured to manage and coordinate the overall operation of the storage and retrieval system 100 and interface with, for example, a warehouse management system 125, which in turn manages the warehouse facility as a whole. The control server 120 may be substantially similar to that described in, for example, U.S. patent application Ser. No. 12/757,337, entitled "CONTROL SYSTEM FOR STORAGE AND RETRIEVAL SYSTEMS" and filed on Apr. 9, 2010, the disclosure of which is incorporated by reference herein in its entirety.

Figure 2:
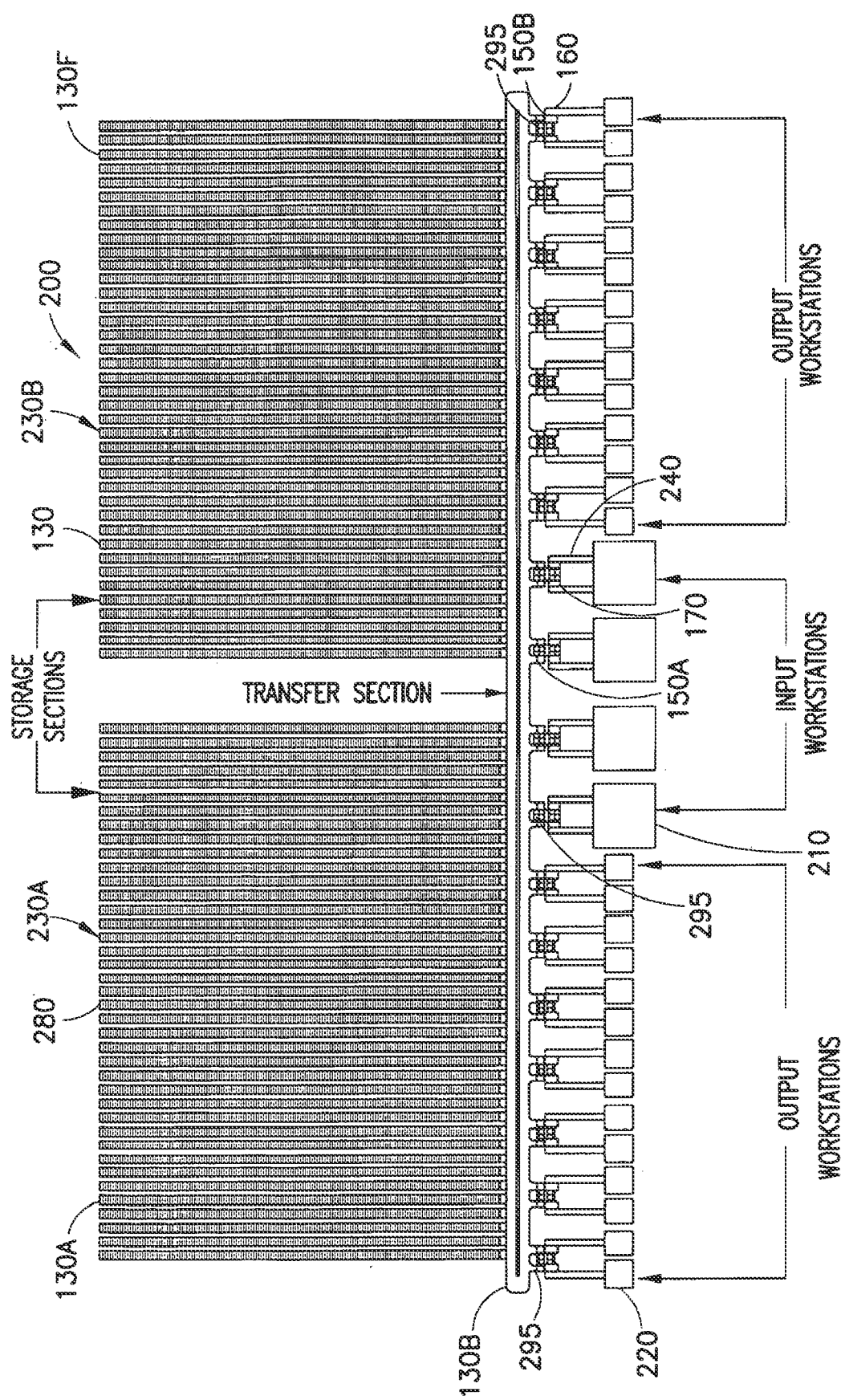
FIG. 2 illustrates a schematic plan view of an exemplary storage and retrieval system in accordance with an aspect of the embodiments.
Figure 3:
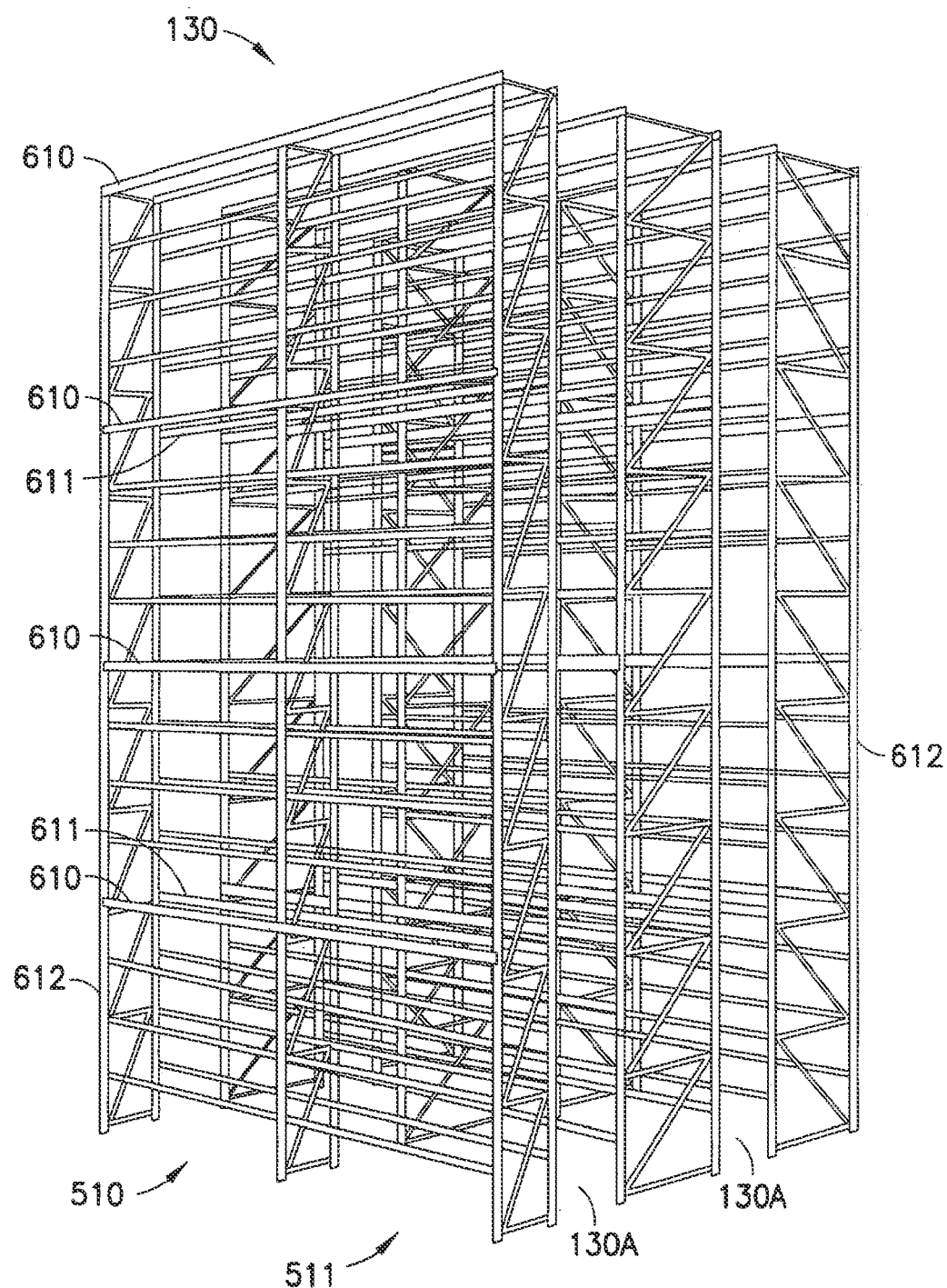
FIG. 3 illustrates a structural portion of a storage and retrieval system in accordance with an aspect of the embodiments.

Referring also to FIG. 2, an exemplary configuration of the storage and retrieval system 100 is shown. Other suitable exemplary configurations of storage and retrieval systems can be found in, for example, U.S. patent application Ser. No. 12/757,381, entitled "STORAGE AND RETRIEVAL SYSTEM" and filed on Apr. 9, 2010, and U.S. Provisional Patent Application No. 61/423,340 entitled "Warehousing Scalable Storage Structure" and filed on Dec. 15, 2010 (now U.S. patent application Ser. No. 13/326,674 filed on Dec. 15, 2011), the disclosures of which are incorporated by reference herein in their entireties. It should be understood that in the storage and retrieval system may have any suitable configuration. As can be seen in FIG. 2, the storage and retrieval system 200 is configured, for exemplary purposes only, as a single-ended picking structure in which only one side of the system 200 has a transfer section or deck 130B. The single-ended picking structure may be used in, for example, a building or other structure having loading docks disposed only on one side of the building. The storage and retrieval system 200 includes transfer deck(s) 130B and picking aisles 130A that allow bots 110 to traverse an entirety of a level of the storage structure 130 on which that bot 110 is located for transporting items between any suitable storage locations/picking aisles 130A and any suitable multilevel vertical conveyors 150A, 150B. The multilevel vertical conveyors 150A, 150B provide transport of case units into the storage and retrieval system 200 through input workstations 210 and provide output of case units from the storage and retrieval system 200 through output workstations 220. The storage and retrieval system 200 includes a first and second storage section 230A, 230B located side by side so that the picking aisles of each section are substantially parallel with each other and facing the same direction (e.g. towards transfer deck 130B). It is noted that the storage and retrieval system may have any suitable number of storage sections arranged relative to each other in any suitable configuration.

Figure 4A:
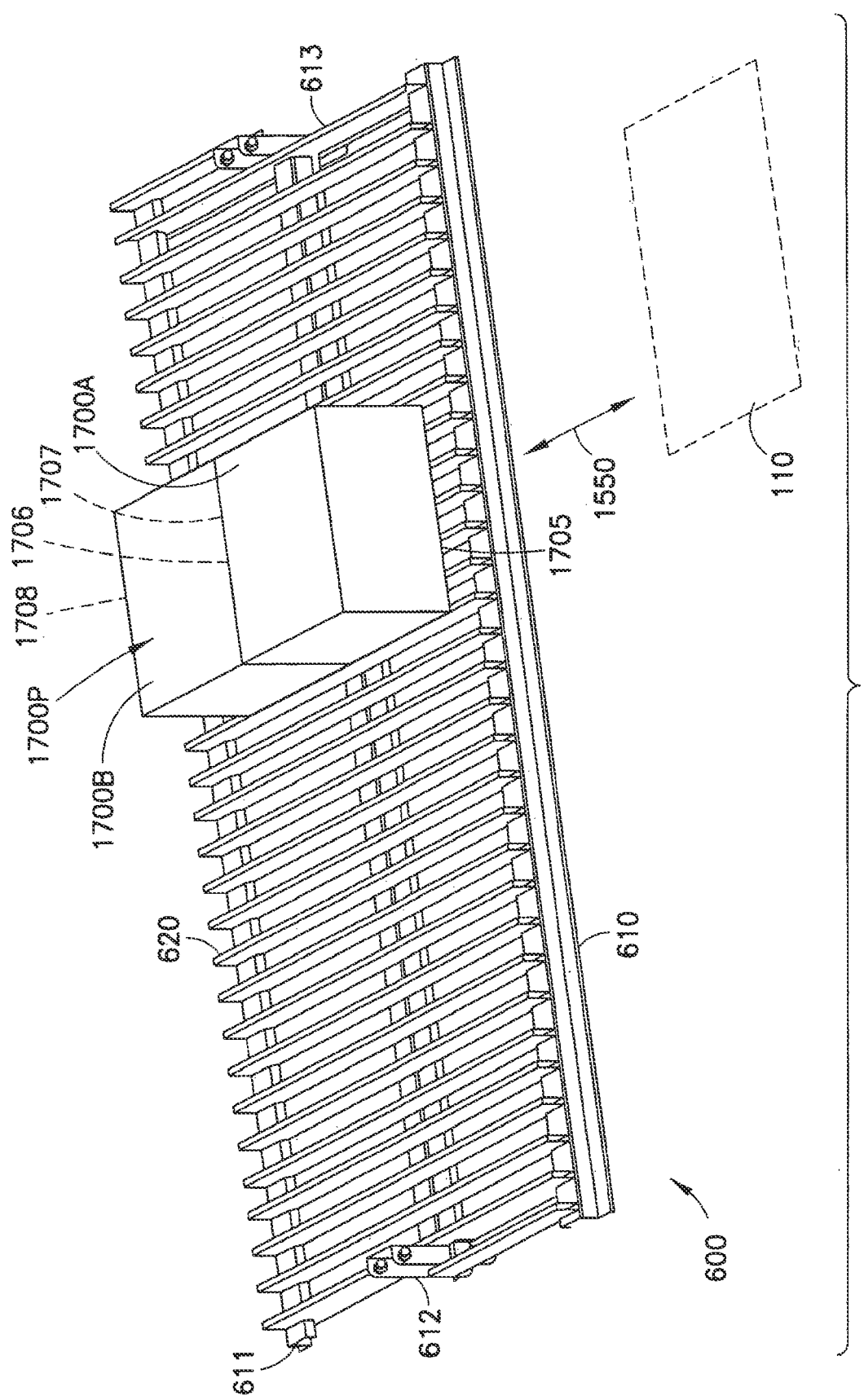
FIGS. 4A and 4B illustrate storage shelves in accordance with an aspect of the embodiments.
Figure 4B:
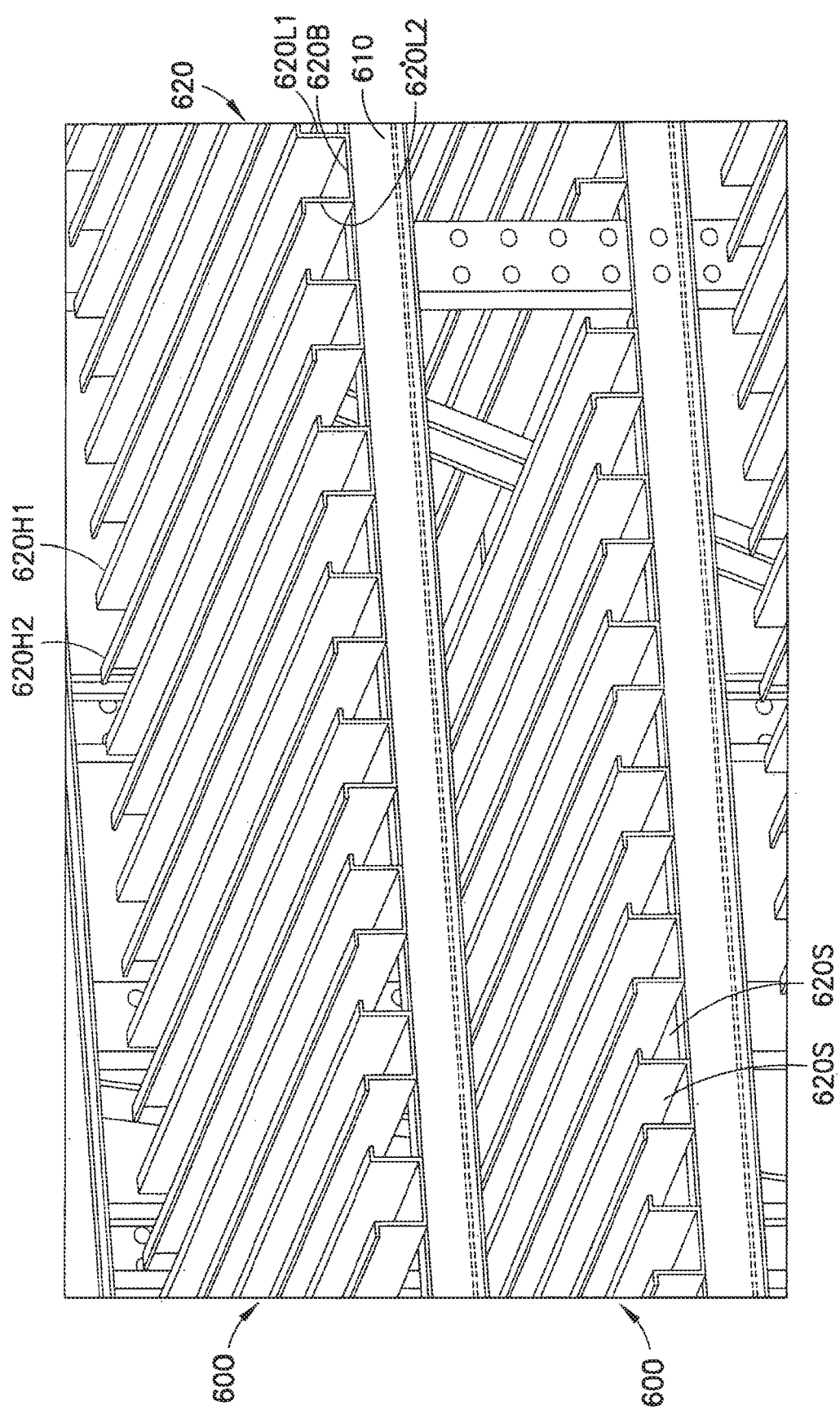

Referring to FIGS. 1, 3, 4A and 4B, each of the storage bays 510, 511 of the storage structure 130 may hold the picking stock on storage shelves 600 that are separated by aisle spaces 130A. In the embodiments the storage bays 510, 511 and storage shelves 600 may be substantially similar to those described in, for example, U.S. patent application Ser. No. 12/757,220, entitled "STORAGE AND RETRIEVAL SYSTEM," and U.S. patent application Ser. No. 12/757,381, entitled "STORAGE AND RETRIEVAL SYSTEM" (both of which being previously incorporated by reference). For example, the storage shelves 600 may include one or more support legs 620L1, 620L2 extending from, for example, the horizontal supports 610, 611, 613 (which are supported by vertical supports 612). The support legs 620L1, 620L2 may have any suitable configuration and may be part of, for example, a substantially U-shaped channel 620 such that the legs are connected to each other through channel portion 620B. The channel portion 620B may provide an attachment point between the channel 620 and one or more horizontal supports 610, 611, 613. It is noted that each support leg 620L1, 620L2 may be configured to individually mount to the horizontal supports 610, 611, 613. In the embodiments, each support leg 620L1, 620L2 includes a bent portion 620H1, 620H2 having a suitable surface area configured to support case units stored on the shelves 600. The bent portions 620H1, 620H2 may be configured to substantially prevent deformation of the case units stored on the shelves. It is noted that the leg portions 620H1, 620H2 may have any suitable thickness or have any other suitable shape and/or configuration for supporting case units stored on the shelves. As can be seen in FIGS. 4A and 4B, the support legs 620L1, 620L2 or channels 620 may form a slatted or corrugated shelf structure where spaces 620S between, for example, the support legs 620L1, 620L2 allow for arms or fingers of the bots 110 to reach into the shelving for transferring case units to and from the shelves. It is also noted that transfer of items to and from the multilevel vertical conveyors 150A, 150B (whether the transfer is made directly or indirectly by the bot 110) may occur in a substantially similar manner to that described above with respect to the storage shelves 600. It is noted that the spacing between the case units on the shelves may be any suitable spacing. It is also noted that transfer of case units to and from the multilevel vertical conveyors 150A, 150B (whether the transfer is made directly or indirectly by the bot 110) may occur in a substantially similar manner to that described above with respect to storage shelves 600.

Figure 5:
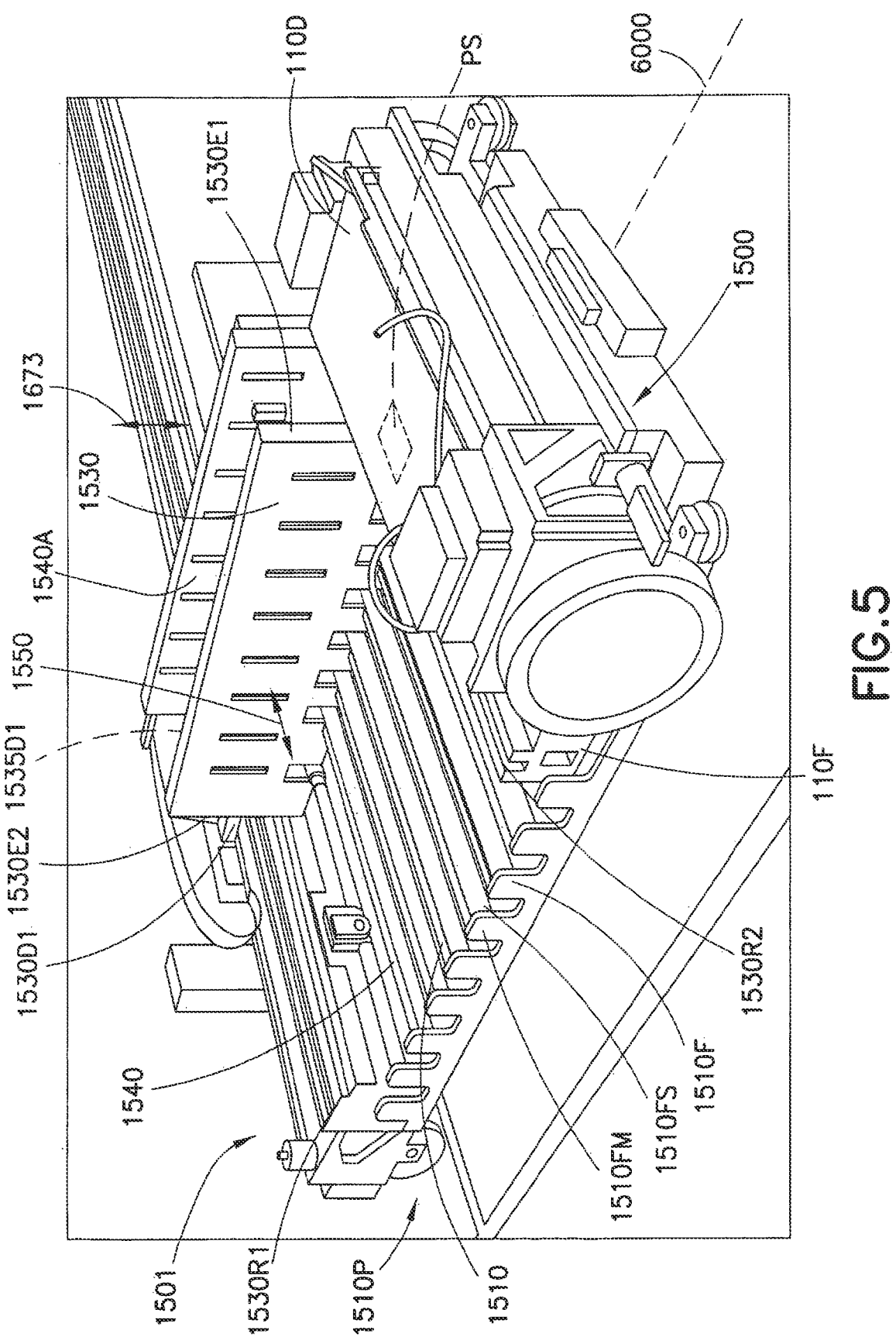

Referring to FIG. 5 an exemplary bot 110 is shown. The bot 110 includes a longitudinally extended frame 110F that has a first end 1500 and a second end 1501 where the longitudinal axis 6000 extends from the first end 1500 to the second end 1501. At least one drive section 110D may be coupled to one of the first and/or second ends 1500, 1501 in any suitable manner for driving the bot 110 along the transfer deck(s) 130B and picking aisles 130A (FIG. 1). The drive 110D may include drive wheels, tracks or any other suitable drive mechanism for effecting travel of the bot along the transfer deck(s) 130B and picking aisles 130A. The other end of the bot 110 may have any suitable supports, such as caster wheels, fixed wheels, steerable wheels, and similar mechanisms for movably supporting the bot 110 as it travels along the transfer deck(s) 130B and picking aisles 130A. The bot 110 may have any suitable controller 1220 (FIG. 1) for effecting operation of the bot 110 (as described herein) and/or communication between the bot 110 and the control server 120 (FIG. 1). As may be realized the configuration of the bot shown in the drawings is merely exemplary and the bot may have any suitable configuration for carrying out the detection and positioning of case units relative to the bot 110 as described herein.

The frame 110F of the bot 110 forms a payload bed 1510 that is configured to hold case units (or a pickface where a pickface is one or more cases that are to be picked and carried by the bot 110) or any other suitable payload. The payload bed 1510 may include any suitable pickface support surface. One example, of the pickface support surface is the roller bed described in, for example, U.S. Provisional Patent Application No. 61/423,220 entitled "BOT PAYLOAD ALIGNMENT AND SENSING," and filed on Dec. 15, 2010 (now U.S. Pat. No. 9,187,244 filed on Dec. 15, 2011 and issued on Nov. 17, 2015), previously incorporated by reference herein. A fence 1510F may be located at a side opening 1510P of the payload bed 1510. The fence 1510F may be attached to the frame 110F in any suitable manner such as with fasteners or welding. It is noted that the fence 1510F may also form part of the frame 110F or be of unitary construction with the frame 110F. The fence may include slots 1510FS disposed between stopping members 1510FM. The slots 1510FS may be configured to allow fingers 1540 of the bot arm to extend through the fence 1510F between the stopping members 1510FM in a substantially lowered position so that fingers 1540 of a transfer arm 1540A can be, for example, extended into a storage shelf 600 below a pickface. The stopping members 1510FM may be configured to extend above the payload bed 1510 to form a barrier that substantially prevents case units from exiting the payload bed 1510 once the case units are positioned on the payload bed 1510. In this example, the number of slots 1510FS is equal to the number of fingers 1540 but it should be understood that the fence 1510F may be configured such that more than one finger 1540 passes through a single slot (e.g. the number of slots is less than the number of fingers).

It should be noted that the fence may have any suitable configuration for preventing case units from exiting the payload area when the case units are carried by the bot 110. For example, the fence may be movable so that the stopping members are retractable such that when in an extended configuration the fence prevents the case units from exiting the payload area.

The bot 110 may include a transfer arm or end effector 1540A. Referring to FIGS. 5 and 6, the transfer arm 1540A may include the fingers 1540 and a movable member 1535. The finger 1540 may extend substantially laterally relative to the longitudinal axis 6000 of the bot and be configured to interface with the slatted shelf structure of the storage shelves 600 (FIGS. 4A and 4B). The fingers 1540 are capable of movement in the direction of arrow 1673 along a lift axis (e.g. in a direction substantially perpendicular to the direction 1550 of extension and retraction of the fingers) between a lowered position and a raised position. It is noted that when in a lowered position the fingers 1540 may be disposed below a surface of the payload bed 1510 or form at least a portion of the payload bed 1510. The fingers may be driven individually or in unison by any suitable drive, as described below, for lifting pickfaces disposed on the fingers over the fence 1510F and into/out of the payload bed 1510 of the bot 110.

Each finger 1540 may include a first end, a mounting member 1671 coupled to the first end, and a second cantilevered end distally located from the mounting member 1671. Each finger 1540 may be movably coupled, in a cantilevered manner, to the movable member 1535 so that the fingers may be extended and retracted (via movement of the movable member 1535) in the direction of arrow 1550 relative to the payload bed 1510. For example, the mounting member 1671 of each finger 1540 may extend from the first end of the finger 1540 and the movable member 1535 may include guides 1670 where each mounting member 1671 and a respective guide 1670 are configured such that the mounting member 1671 is slidable along the guide 1670 in the direction of arrow 1673 (e.g. substantially perpendicular to the direction 1550 of lateral travel of the fingers). As may be realized the interface between the mounting member 1671 and the guide 1670 may be a distributed interface configured to support a load, such as a pickface, carried by the fingers 1540. In the embodiments the guides 1670 are shown as rails but it should be understood that in the embodiments the guides may be any suitable member for allowing a respective finger to controllably move in the direction of arrow 1673. In this example, all of the fingers 1540 (regardless of whether the fingers are in the raised or lowered positions) move as a unit by single axis drive 1531 with the movable member 1535 when the fingers are laterally extended and retracted in the direction of arrow 1550. However, the movable member 1535 and/or fingers 1540 may be configured to allow each finger 1540 to move laterally in the direction of arrow 1550 independent of other fingers 1540. It is also noted that the movable member 1535 and/or fingers 1540 may be configured to allow groups of fingers to move laterally in the direction of arrow 1550 independent of other groups of fingers.

At least one drive unit 1672 may be mounted to the movable member 1535 and coupled to the first end of one or more fingers 1540 in any suitable manner for driving the one or more fingers along the guides 1670 in the direction of arrow 1673 along the lift axis. In the embodiments, each finger may have a respective drive unit 1672 so that each finger 1540 can be independently raised and lowered or a single drive unit may drive more than one finger along its respective guide (or e.g. some fingers may individually moveable while others are movable in groups). The drive unit 1672 may be any suitable drive unit capable of driving the finger(s) in the direction of arrow 1673. One example, of a suitable drive unit is described in, for example, U.S. Provisional Patent Application No. 61/423,388 entitled "AUTOMATED BOT TRANSFER ARM DRIVE SYSTEM," and filed on Dec. 15, 2010 (now U.S. Pat. No. 9,499,338 filed on Dec. 15, 2011 and issued on Nov. 22, 2016), the disclosures of which are incorporated by reference herein in their entireties. It is noted that the drive unit and guide may be incorporated with each other as a unit such as, for exemplary purposes only, in the case of a chain/belt and sprocket/pulley where the chain or belt is arranged to carry the finger in the direction of arrow 1673. In the embodiments, each drive unit 1672 may be selectable by, for example, the bot controller 1220 and independently operable for lifting a respective finger 1540. It is noted, however, that any suitable controller, such as for example, the control server 120 may select the drive units to actuate. In one aspect the storage and retrieval system may include case unit and or pickface sensors for determining one or more dimensions of one or more of the case units and pickfaces formed by the case units. For example, the in-feed transfer stations 170 may include any suitable sensors CS (FIG. 1) for determining one or more dimensions of the case units and/or pickfaces (FIG. 10, Block 9000). The bot 110 may also include any suitable sensors PS (FIG. 5) located, for example, in the payload bed for determining one or more dimensions of the case unit(s) and/or pickface(s) carried by the bot 110. In other aspects any suitable sensors may be disposed in any suitable location of the storage and retrieval system for determining one or more dimensions of the case units and/or pickfaces. The sensors CS, PS may be in communication with one or more of the bot controller and control server 120 where the dimensions of the case unit(s) and/or pickface(s) may be stored in any suitable memory of the bot controller and/or control server 120. As noted above, when the drives 1672 for lifting the fingers 1540 are actuated the bot controller and/or control server 120 may use case/pickface data obtained from one or more of the sensors CS, PS for determining which drives 1672 to actuate (e.g. which fingers to lift) depending on a dimension of the case as determined by the case/pickface data (FIG. 10, Block 9010). As may be realized, data from a position of the case unit(s)/pickface(s) in the payload bed, e.g. as determined by the sensors PS, of the bot may also be used in determining which drives 1672/fingers 1540 to actuate/lift. In the embodiments each drive unit 1672 may be selectably coupled to the respective finger 1540 by releasable couplings 1672D (e.g. mechanical, magnetic, etc.) or the drive units 1672 may be substantially permanently coupled to the respective fingers such as through a pivotable or otherwise movable joint or coupling.

In other aspects, referring to FIG. 5A, the bot 110 may include one or more side blades 1535G mounted to the bot arm 110A. One or more of the blades 1535G may be moved along the longitudinal axis 6000 of the bot 110 in the direction of arrow 1550X for aligning the pickface (e.g. one or more case units 1705) on the bot arm 110A. The translational movement of the one or more side blades 1535G may allow for the positioning of the bot payload anywhere along the longitudinal axis of the bot within the bot payload area and may provide fine adjustment for case positioning onto the storage shelves 600. It is noted that in this aspect the side blades 1535G may not carry, transport or lift the case units 1705 but may aid in case unit 1705 control during picking and placing the case units. It is noted that one side blade 1535G may be fixed and act as a datum for aligning the case units 1705.

Figure 7:
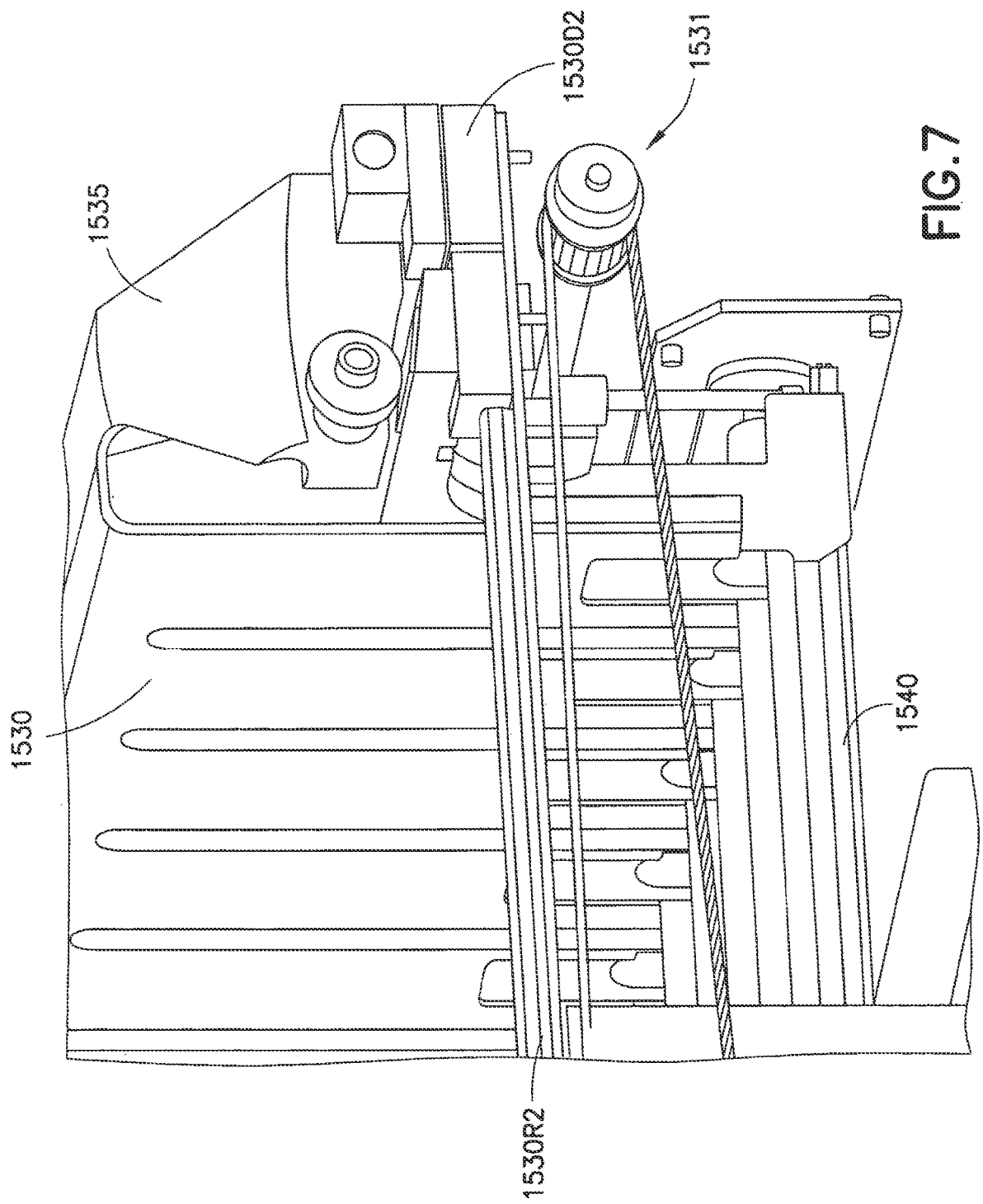

The case unit contact member 1530 may be movably located at least partially within the payload area. It is noted that the case unit contact member 1530 may include any suitable slots 1680 that allow each finger to be lifted in the direction of arrow 1673 without substantially contacting the case unit contact member 1530. In this example, the case unit contact member has a slot 1680 for each finger 1540 but it should be understood that the slots 1680 may have any suitable configuration such as for example, a configuration that allocates one slot to more than one finger 1540. The case unit contact member 1530 may be driven in the direction of arrow 1550 by any suitable drive 1531. For exemplary purposes only, the drive 1531 may be a belt and pulley drive (FIG. 7) but it should be understood that the drive may be any suitable drive for causing movement of the case unit contact member in the direction of arrow 1550. In the embodiments both of the case unit contact member 1530 and the movable member 1535 are configured to move in the direction of arrow 1550 along rails 1530R1, 1530R2. The rails 1530R1, 1530R2 may be mounted to the frame 110F in any suitable manner for guiding the movement of the case unit contact member 1530 and the movable member 1535. It should be understood that in the embodiments the movement of the case unit contact member 1530 and the movable member 1535 in the direction of arrow 1550 may be guided in any suitable manner such as by separate rail systems (e.g. each of the case unit contact member 1530 and the movable member 1535 have their own distinct rails). For exemplary purposes only, referring to FIGS. 5 and 7, each of the case unit contact member 1530 and the movable member 1535 may have respective slide members 1530D1, 1530D2, 1535D1, 1535D2 for movably coupling the case unit contact member 1530 and the movable member 1535 to the rails 1530R1, 1530R2. The one or more of the slide members 1530D1, 1530D2, 1535D1, 1535D2 may be distributed or suitably sized to extend along the rails for supporting a pickface that is supported on the cantilevered fingers 1540 of the transfer arm 1540A. The case unit contact member 1530 may be independently movable in the direction of arrow 1550 for engaging or otherwise orienting case units disposed on the payload bed 1510 as described in, for example, U.S. Provisional Patent Application No. 61/423,220 entitled "BOT PAYLOAD ALIGNMENT AND SENSING," (now U.S. Pat. No. 9,187,244 filed on Dec. 15, 2011 and issued on Nov. 17, 2015), previously incorporated by reference herein.

Figure 8B:
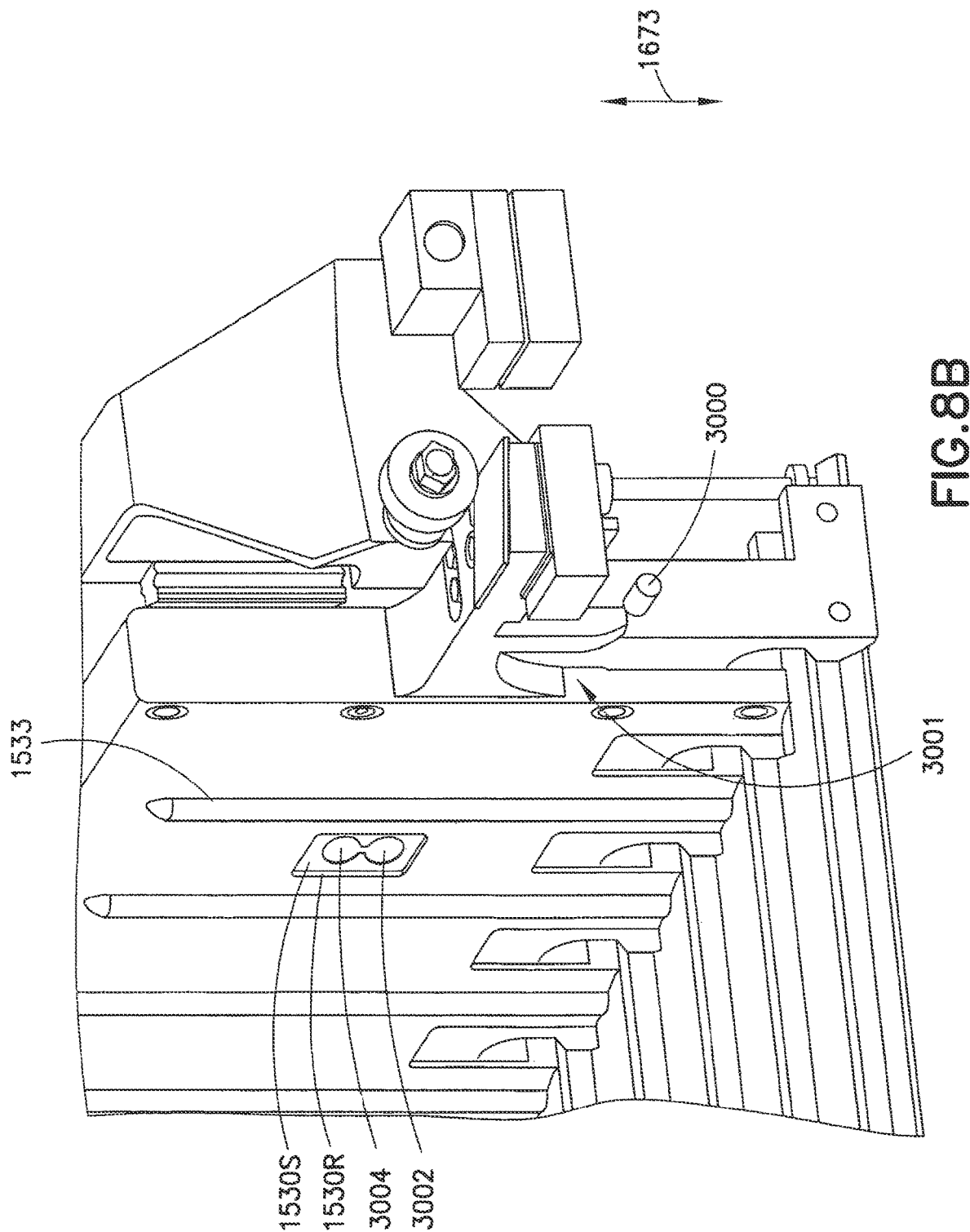

Referring to FIGS. 6, 8A and 8B, the case unit contact member 1530 may be releasably coupled to the movable member 1535 in any suitable manner for engaging the movable member 1535. Engagement of the case unit contact member 1530 with the movable member 1535 allows the case unit contact member 1530 and the movable member 1535 (and hence the arm/fingers of the bot) to be driven by a single axis drive and move as a unit in the direction of arrow 1550 for extending and retracting the fingers 1540 with the driven movement of the case unit contact member 1530. The releasable coupling between the movable member 1535 and the case unit contact member 1530 may be passively effected through the lifting and lowering of at least one of the fingers 1540 where the coupling is engaged when at least one of the fingers 1540 is lifted and the coupling is disengaged when the fingers 1540 are in their substantially lowered positions. It is noted that when the fingers are lowered (e.g. the coupling is disengaged) the case unit contact member 1530 is movable independent of the movable member 1535 to for example, justify pickfaces on the payload bed or to grip the pickface as described in, for example, U.S. Provisional Patent Application No. 61/423,220 entitled "BOT PAYLOAD ALIGNMENT AND SENSING," (now U.S. Pat. No. 9,187,244 filed on Dec. 15, 2011 and issued on Nov. 17, 2015), previously incorporated by reference herein. Each mounting member 1671 may include any suitable protrusion which, when the mounting member 1671 is lifted to raise the respective finger, engages a complimentary recess of the case unit contact member 1530. As described above, because the mounting members 1671 are mounted to and slidable relative to the movable member 1535 only in the direction of arrow 1673 (e.g. substantially perpendicular to the direction of travel 1550 of the case unit contact member 1530) engagement of the protrusion within the recess causes the movable member 1535 to be selectively coupled to the case unit contact member 1530 so that when the case unit contact member is driven by drive 1531 (FIG. 7) the movable member 1535 is also driven to extend and retract the fingers 1540.

In the embodiments the protrusion and recess may be in the form of a key 3004 and keyhole 3002 as shown in FIG. 8B. However, it should be understood that in the embodiments the protrusion and recess may have any suitable configuration. Here the key 3004 may extend from a side of one or more of the mounting members 1671 facing the case unit contact member 1530 so that when the case unit contact member 1530 is in a retracted position (e.g. closest to the movable member 1535) the key(s) 3004 extends through a respective key hole 3002 in the case unit contact member 1530. As one or more mounting members 1671 (e.g. finger 1540) is lifted the key 3004 of the one or more mounting members 1671 moves into a slot of the respective keyhole 3002 so that a portion of the key 3004 overhangs the keyhole slot to substantially engage a surface 1530S of the case unit contact member 1530. In one example, the keyhole and key may be positioned within a recess 1530R of the case unit contact member 1530 so as not to interfere with any pickfaces that may be in substantial contact with the case unit contact member 1530. It is noted that the case unit contact member 1530 may include raised portions or ribs 1533 that extend from a face of the case unit contact member 1530 for substantially preventing interference between the keyhole and key and any pickfaces located on the fingers 1540 or payload bed 1510.

In the embodiments the protrusion may be in the form of one or more pins 3000 that extend from the mounting member 1671 and the recess may be in the form of one or more slots 3001 located in the case unit contact member 1530. The one or more slots 3001 may be disposed adjacent one or more of the mounting members 1671 when the case unit contact member 1530 is in a substantially retracted position as shown in FIGS. 8A and 8B. When the case unit contact member 1530 is in the retracted position the slot 3001 is substantially aligned with the pin 3000 in the direction 1673 so that when the mounting member 1671 (e.g. finger 1540) is lifted by a respective one of the drives 1672 the pin 3000 is moved into and engages the slot 3001. In the embodiments at least one slot 3001 is located adjacent the ends 1530E1, 1530E2 of the case unit contact member 1530 such that only the mounting members 1671 of the outermost fingers 1540 are capable of engaging the slots 3001 for coupling the movable member 1535 to the case unit contact member 1530. Here the pickface may be positioned on the payload bed 1510 (FIG. 5) so that the pickface is aligned with at least one of the outermost fingers 1540 during transfer of the pickface to and from the bot 110. It is noted that there may be slots disposed along the length of the case unit contact member so that any one of the mounting members 1671 can effect coupling of the movable member 1535 to the case unit contact member 1530 when a respective finger 1540 is raised.

As may be realized, the pin 3000 and slot 3001 engagement may be used separately from or in conjunction with the key 3004 and keyhole 3002 engagement in any suitable manner. For example, the mounting members 1671 of outermost fingers 1540 may be configured with pins 3000 to engage the recesses 3001 located adjacent the ends 1530E1, 1530E2 of the case unit contact member 1530 while the mounting members 1671 of inner fingers (located between the outermost fingers) are configured with keys 3004 for engaging keyholes 3002 located between the ends 1530E1, 1530E2 of the case unit contact member 1530. It is noted that in the embodiments the engagement between the case unit contact member 1530 and the movable member 1535 may be accomplished in any suitable manner. As may also be realized, the releasable coupling between the movable member 1535 (e.g. the bot transfer arm) and the case unit contact member 1530 may be effected by lifting any suitable number of the fingers 1540. For example, the coupling may be effected by lifting one of the outermost fingers, both of the outermost fingers, one of the inner fingers, more than one inner finger or any suitable combination of inner and outer fingers. Further, the slots 3001 and keyholes 3002 may be configured to allow coupling of the movable member 1535 and the case unit contact member 1530 through only a partial lifting of one or more of the fingers 1540. For example, coupling engagement of the slots and keyholes with their respective pins and keys may occur when the fingers are raised to a position for insertion into the storage shelf 600 beneath a pickface. The slots and keyholes may further be configured to allow further lifting of the fingers 1540 (e.g. the keys and pins are slidable within an engagement portion of the respective keyhole and slot) so that the pickface can be lifted off of the storage shelf 600 and transferred to the payload bed 1510 of the bot 110.

Referring now to FIGS. 4A and 9 an exemplary operation of the bot 110 will be described. The bot controller 1220 may direct the bot to a predetermined pickface location at, for example, a storage rack 600 (or multilevel vertical conveyor). The pickface location may include a pickface 1700P where each case unit 1700A, 1700B of the pickface 1700P is located on the storage rack 600 so that the a position of the front and back edges 1705, 1706 of case unit 1700A are known and the front and back edges 1707, 1708 of case unit 1700B are known by, for example, the bot controller 1220 and/or the control server 120. While pickface 1700P is shown as having two case units 1700A, 1700B it is noted that the pickface may include any suitable number of case units. The bot controller 1220 may cause one or more fingers 1540 to raise a predetermined distance (e.g. only partially raised to allow insertion of the fingers into the storage shelf 600 beneath the pickface 1700P) so that the movable member 1535 is coupled to the case unit contact member 1530. The one or more fingers 1540 may be extended into the slats of the storage shelf beneath the case unit(s) to be picked. The bot controller 1220 or any other suitable controller may be configured to determine the amount of arm extension so that the cantilevered tips of the raised fingers 1540 "underpick" the furthest case unit (from the bot along an axis of extension of the fingers 1540) to be transferred to the bot 110. For example, if the bot 110 is instructed to pick case 1700A only, the fingers 1540 may be extended into the storage rack so that the tip of the cantilevered fingers 1540 are located a predetermined distance U (e.g. the underpick) away from the back edge 1706 of the case unit 1700A. If the bot 110 is instructed to pick cases 1700A and 1700B, the fingers 1540 may be extended into the storage rack so that the tip of the cantilevered fingers 1540 are located a predetermined distance U away from the back edge 1708 of the case unit 1700B. The underpick U allows one or more cases to be picked without disturbing the next case in the pickface. For example, case unit 1700A can be picked without disturbing case unit 1700B. Once underneath the case unit(s) to be picked (which for exemplary purposes only is case unit 1700A) the fingers are raised to pick the case unit 1700A off of the shelf and the fingers are retracted in the direction of arrow 1550 so that the case unit 1700B is transferred to the bot payload area in a manner substantially similar to that described in, for example, U.S. Provisional Patent Application No. 61/423,220 entitled "BOT PAYLOAD ALIGNMENT AND SENSING," (now U.S. Pat. No. 9,187,244 filed on Dec. 15, 2011 and issued on Nov. 17, 2015), previously incorporated by reference herein.

When the case unit(s) 1700A are transferred onto the payload bed 1510 of the bot 110, clearance C is needed between the edge 1706 of the case unit 1700A and the fence 1510F so that the case unit 1700A does not hit the fence 1510F or trip a case overhang sensor 1703 as the case unit is lowered onto the payload bed 1510. The amount of clearance C may be determined by subtracting both the underpick distance U and the finger length L from the depth D of the payload bed 1510 (e.g. C=D−L−U). In one example the underpick distance U may be a predetermined distance such as about 9 mm or any other suitable distance and the depth D of the payload bed 1510 may be a constant value. As such, to increase the amount of clearance C between the edge 1706 of the case unit 1700A and the fence 1510F the length L of the fingers 1540 has to decrease. Alternatively, if the clearance C is a predetermined distance and the depth D of the payload bed 1510 remains constant, the finger length L has to decrease to increase the underpick distance U (e.g. U=D−L−C). As may be realized, the underpick U and clearance C may be adjusted without changing the finger length L, but the underpick U and clearance C may not be changed independently without changing the arm length L.

In accordance with a first aspect of the exemplary embodiments an autonomous transport vehicle is provided. The transport vehicle includes a payload bed and a transfer arm disposed in the payload bed and configured to extend along a first axis to transfer a pickface to and from the payload bed. The transfer arm includes fingers that are independently movable relative to each other along a second axis, substantially perpendicular to the first axis for picking and placing the pickface.

In accordance with the first aspect of the exemplary embodiments, the autonomous transport vehicle includes a drive unit for each of the fingers where the drive unit is configured to selectively move a respective finger along the second axis.

In accordance with a first sub-aspect of the first aspect of the exemplary embodiments, the autonomous transport vehicle includes a movable member to which the fingers are mounted such that the fingers are cantilevered from the movable member for unitary movement along the first axis.

In accordance with the first sub-aspect of the first aspect of the exemplary embodiments, the autonomous transport vehicle includes a driven member configured to be selectively coupled to the movable member for effecting movement of the transfer arm along the first axis.

In accordance with the first sub-aspect of the first aspect of the exemplary embodiments, one or more of the fingers includes a protrusion and the driven member includes at least one corresponding recess, where when the one or more fingers are raised the protrusion engages the recess for coupling the movable member to the driven member.

In accordance with a second aspect of the exemplary embodiments, an autonomous transport vehicle is provided. The autonomous transport vehicle includes a driven member, a movable member and a positionable coupling configured to selectively couple the movable member to the driven member, the positionable coupling is capable of being coupled and uncoupled wherein when uncoupled the driven member is movable along a first axis independent of the movable member and when coupled the driven member and the movable member move along the first axis as a unit.

In accordance with the second aspect of the exemplary embodiments, the autonomous transport vehicle further includes a payload bed where the driven member is configured to at least orient case units on the payload bed and the movable member in part transfers the case units to and from the payload bed.

In accordance with a first sub-aspect of the second aspect of the exemplary embodiments, the movable member includes fingers that are movable along a second axis, the second axis being substantially perpendicular to the first axis where one or more of the fingers engages the driven member for coupling the movable member to the driven member.

In accordance with the first sub-aspect of the second aspect of the exemplary embodiments the autonomous transport vehicle includes a controller configured to determine an amount of travel of the fingers along the first axis such that cantilevered tips of the fingers are spaced from a distal end of a case unit being picked so as not to extend beyond an edge of the case unit.

In accordance with the second aspect of the exemplary embodiments, the movable member includes at least one side blade configured to substantially contact a side of one or more case units for aligning the one or more case units for transfer to a storage shelf.

In accordance with a third aspect of the exemplary embodiments, an autonomous transport vehicle is provided. The autonomous transport vehicle includes a frame including a transport area, a drive system, and a transfer arm having fingers disposed in the transport area and connected to the frame through the drive system, wherein the drive system is configured to move the fingers along a first axis as a unit and move each finger independently relative to other fingers of the transfer arm along a second axis that is substantially perpendicular to the first axis.

In accordance with the third aspect of the exemplary embodiments, the drive system comprises a single axis drive common to all fingers and configured to move the fingers along the first axis.

In accordance with the third aspect of the exemplary embodiments, the drive system comprises a linear drive for each finger, where each linear drive is configured to individually move a respective finger along the second axis independently of other ones of the fingers.

In accordance with the third aspect of the exemplary embodiments, the drive system comprises a linear drive selectively coupled to each of the fingers, where the linear drive is configured to move one or more fingers along the second axis.

In accordance with a first sub-aspect of the third aspect of the exemplary embodiments, movement of the fingers along the second axis couples the fingers to the drive system for movement along the first axis.

In accordance with the first sub-aspect of the third aspect of the exemplary embodiments, the autonomous transport vehicle further includes a movable member configured to interface with a payload of the autonomous transport vehicle wherein the drive system is configured move one or more fingers along the second axis to selectively couple the one or more fingers to the movable member and move the one or more fingers along the first axis by driving the movable member along the first axis.

In accordance with the third aspect of the exemplary embodiments, the fingers are cantilevered from the frame.

It should be understood that the exemplary embodiments disclosed herein can be used individually or in any suitable combination thereof. It should also be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. A method for transporting a payload pickface, the method comprising:
   providing an autonomous transport vehicle payload bed of an autonomous guided transport vehicle; and
   providing a transfer arm disposed in the autonomous transport vehicle payload bed and defining at least a portion of the autonomous transport vehicle payload bed so that a payload pickface is seated on and stably held in the autonomous transport vehicle payload bed by at least a portion of the transfer arm for autonomous guided transport vehicle travel, the transfer arm including fingers configured to extend along a first axis to transfer the payload pickface to and from the autonomous transport vehicle payload bed, and
   effecting picking and placing of the payload pickface with the fingers of the transfer arm, the fingers define a payload bed support surface of the autonomous transport vehicle payload bed, the fingers facing and defining an engagement interface against the payload pickface so as to uphold weight generated by the payload pickface seated on over the payload bed support surface defined by the fingers and stably held in the autonomous transport vehicle payload bed, at least one of the fingers moves independently relative to another linearly along a second axis, substantially perpendicular to the first axis for effecting the picking and placing the payload pickface.

2. The method of claim 1, further comprising selectively moving a respective finger along the second axis with a drive unit of a respective finger.

3. The method of claim 1, further comprising a movable member to which the fingers are mounted such that the fingers are cantilevered from the movable member for unitary movement along the first axis.

4. The method of claim 3, further comprising effecting movement of the transfer arm along the first axis with a driven member configured to be selectively coupled to the movable member.

5. The method of claim 4, wherein one or more of the fingers includes a protrusion and the driven member includes at least one corresponding recess, where when the one or more fingers are raised the protrusion engages the recess for coupling the movable member to the driven member.

6. A method comprising:
providing a frame of an autonomous guided transport vehicle, the frame having a payload bed;
providing a driven member connected to the frame;
providing a movable member connected to the frame and defining at least a portion of the payload bed so that a payload pickface is seated on and stably held in the payload bed by at least a portion of the movable member for autonomous guided transport vehicle travel; and
effecting selectively mechanically couple from an uncoupled condition and decouple from a coupled condition the movable member to the driven member with an automatic mechanical coupling connected to the frame, the automatic mechanical coupling having a first position being configured to mechanically couple and a second position configured to mechanically uncouple wherein when mechanically uncoupled the driven member moves along a first linear axis independent of the movable member and when mechanically coupled the driven member and the movable member move along the first linear axis as a unit, the automatic mechanical coupling being configured to automatically select between being in the first position and the second position automatically mechanically coupling and mechanically uncoupling the driven member and the movable member.

7. The method of claim 6, further comprising orienting, with the driven member, case units on the payload bed and transferring, in part, the case units to and from the payload bed with the movable member.

8. The method of claim 6, wherein the movable member includes fingers that are configured to move along a second axis, the second axis being substantially perpendicular to the first linear axis where one or more of the fingers engages the driven member for mechanically coupling the movable member to the driven member.

9. The method of claim 8, further comprising determining, with a controller, an amount of travel of the fingers along the first linear axis such that cantilevered tips of the fingers are spaced from a distal end of a case unit being picked so as not to extend beyond an edge of the case unit.

10. The method of claim 6, further comprising transferring the one or more case units between the autonomous transport vehicle and a storage shelf with at least one gripper of the movable member, the at least one gripper configured to substantially contact a side of one or more case units.

11. A method comprising:
providing an autonomous guided transport vehicle frame including a transport area;
providing a drive system; and
providing a transfer arm having fingers disposed in the transport area and defining at least a portion of the transport area so that a payload pickface is seated on and stably held in a payload bed of the transport area by at least a portion of the transfer arm for autonomous guided transport vehicle travel, the fingers define a payload bed support surface of the payload bed, the fingers facing and defining an engagement interface against the payload pickface so as to uphold weight generated by the payload pickface seated on over the payload bed surface defined by the fingers and stably held in the payload bed, the transfer arm being connected to the autonomous transport vehicle frame through the drive system, wherein the drive system is configured to move the fingers along a first axis as a unit and move at least one of the fingers independently relative to another finger of the transfer arm linearly along a second axis that is substantially perpendicular to the first axis.

12. The method of claim 11, wherein the drive system comprises a single axis drive common to all fingers and configured to move the fingers along the first axis.

13. The method of claim 11 wherein the drive system comprises a linear drive for each finger, where each linear drive is configured to individually move a respective finger along the second axis independently of other ones of the fingers.

14. The method of claim 11 wherein the drive system comprises a linear drive selectively coupled to each of the fingers, where the linear drive is configured to move one or more fingers along the second axis.

15. The method of claim 11, wherein movement of the at least one finger along the second axis couples the finger to the drive system for movement along the first axis.

16. The method of claim 15, further comprising a movable member configured to interface with the payload pickface of the autonomous transport vehicle wherein the drive system is configured move one or more fingers along the second axis to selectively couple the one or more fingers to the movable member and move the one or more fingers along the first axis by driving the movable member along the first axis.

17. The method of claim 11, wherein the fingers are cantilevered from the autonomous transport vehicle frame.

* * * * *